(12) United States Patent
Kito et al.

(10) Patent No.: US 10,018,265 B2
(45) Date of Patent: Jul. 10, 2018

(54) POWER TRANSMISSION DEVICE

(71) Applicant: AISIN AW CO., LTD., Anjo-shi, Aichi-ken (JP)

(72) Inventors: Masashi Kito, Anjo (JP); Takeshi Torii, Chiryu (JP); Kentaro Kakuda, Anjo (JP); Kazuya Kawamura, Anjo (JP); Tomoki Nishikubo, Anjo (JP); Shinya Yamamoto, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 313 days.

(21) Appl. No.: 14/888,155

(22) PCT Filed: Mar. 27, 2014

(86) PCT No.: PCT/JP2014/058928
§ 371 (c)(1),
(2) Date: Oct. 30, 2015

(87) PCT Pub. No.: WO2014/208160
PCT Pub. Date: Dec. 31, 2014

(65) Prior Publication Data
US 2016/0076636 A1 Mar. 17, 2016

(30) Foreign Application Priority Data
Jun. 28, 2013 (JP) ................................. 2013-136356

(51) Int. Cl.
*F16H 57/037* (2012.01)
*F16H 48/08* (2006.01)
(Continued)

(52) U.S. Cl.
CPC ........... *F16H 57/037* (2013.01); *F16H 3/663* (2013.01); *F16H 48/08* (2013.01); *F16H 57/029* (2013.01);
(Continued)

(58) Field of Classification Search
None
See application file for complete search history.

(56) References Cited

U.S. PATENT DOCUMENTS 5,505,112 A * 4/1996 Gee ..................... F16H 57/0447
180/339
9,752,673 B2 * 9/2017 Koga .................. F16H 57/0421
(Continued)

FOREIGN PATENT DOCUMENTS

| CN | 102770691 A | 11/2012 |
| JP | 61-128104 U | 8/1986 |

(Continued)

OTHER PUBLICATIONS

International Search Report of PCT/JP2014/058928 dated Jul. 1, 2014.

*Primary Examiner* — Jacob S. Scott
(74) *Attorney, Agent, or Firm* — Sughrue Mion, PLLC

(57) ABSTRACT

A reservoir plate for dividing an inside of a transmission case into a differential chamber and a hydraulic oil storage chamber includes: a cylindrical portion covering a part of a differential gear; a flange portion radially extending from the cylindrical portion; and a differential ring surrounding portion extending from an outer circumferential edge of the flange portion so that a part of a differential ring gear is covered from above without interfering with a drive pinion gear. The cylindrical portion, the flange portion, and the differential ring surrounding portion are integrally formed with each other. A seal member is interposed between the transmission case and the outer circumferential edge of the flange portion at least in the range below the differential ring surrounding portion.

27 Claims, 17 Drawing Sheets

(51) Int. Cl.
  *F16H 57/04* (2010.01)
  *F16H 57/029* (2012.01)
  *F16H 3/66* (2006.01)

(52) U.S. Cl.
  CPC ......... *F16H 57/04* (2013.01); *F16H 57/0453* (2013.01); *F16H 57/0483* (2013.01); *F16H 2200/006* (2013.01); *F16H 2200/0086* (2013.01); *F16H 2200/2007* (2013.01); *F16H 2200/2023* (2013.01); *F16H 2200/2046* (2013.01); *F16H 2200/2082* (2013.01)

(56) References Cited

U.S. PATENT DOCUMENTS

| | | |
|---|---|---|
| 2006/0060424 A1 | 3/2006 | Tominaga et al. |
| 2011/0245010 A1* | 10/2011 | Nobata ............... F16H 57/0457 475/160 |
| 2014/0235395 A1* | 8/2014 | Sigl .................... F16H 57/0409 475/160 |
| 2017/0102065 A1* | 4/2017 | Ohmura ............. F16H 57/0423 |

FOREIGN PATENT DOCUMENTS

| | | |
|---|---|---|
| JP | 63-152963 U | 10/1988 |
| JP | 11-98616 A | 4/1999 |
| JP | 2005-83528 A | 3/2005 |
| JP | 2006-90350 A | 4/2006 |
| JP | 2012-062995 A | 3/2012 |
| WO | 2011/121861 A1 | 10/2011 |

\* cited by examiner

FIG. 2

|  |  | C-1 | C-2 | C-3 | C-4 | B-1 | B-2 | F-1 |
|---|---|---|---|---|---|---|---|---|
| D | 1st | ○ |  |  |  |  | ● | ○ |
|  | 2nd | ○ |  |  |  | ○ |  |  |
|  | 3rd | ○ |  | ○ |  |  |  |  |
|  | 4th | ○ |  |  | ○ |  |  |  |
|  | 5th | ○ | ○ |  |  |  |  |  |
|  | 6th |  | ○ |  | ○ |  |  |  |
|  | 7th |  | ○ | ○ |  |  |  |  |
|  | 8th |  | ○ |  |  | ○ |  |  |
| REV1 |  |  |  | ○ |  |  | ○ |  |
| REV2 |  |  |  |  | ○ |  | ○ |  |

※○ : ENGAGED
● : ENGAGED WHEN ENGINE BRAKE IS IN OPERATION.

DIRECTION OF ROTATION OF DIFFERENTIAL RING GEAR DURING FORWARD RUNNING

POWER TRANSMISSION DEVICE

CROSS REFERENCE TO RELATED APPLICATIONS

This application is a National Stage of International Application No. PCT/JP2014/058928 filed Mar. 27, 2014, claiming priority based on Japanese Patent Application No. 2013-136356 filed Jun. 28, 2013, the contents of all of which are incorporated herein by reference in their entirety.

TECHNICAL FIELD

The present disclosure relates to a power transmission device including a differential ring gear that is arranged below a drive pinion gear provided on the input side and meshes with the drive pinion gear, a differential gear connected to the differential ring gear, and a case that accommodates the differential ring gear and the differential gear.

BACKGROUND ART

A power transmission device of such a type has heretofore been known, which includes a countershaft arranged in parallel with an input shaft of a speed change mechanism, a differential device (differential gear) including a ring gear (differential ring gear) that is arranged below the countershaft and meshes with an output gear of the countershaft, a case member accommodating the speed change mechanism and the differential device, and a differential dividing member that divides the inside of the case member into a differential chamber in which the differential device is arranged and a storage chamber for storing oil (hydraulic oil) (refer to Patent Document 1, for example). The differential dividing member of the power transmission device is constituted by a part of the case member, a rib member extending along the outer circumferential surface of the ring gear from the case member, and a hemispherical reservoir plate that covers the differential device from the side opposite to the case member and is arranged so as to be tightly attached to the inner circumferential surface of the rib member. This structure allows the differential dividing member to suppress entry of the oil from the storage chamber into the differential chamber, in the power transmission device.

PRIOR ART DOCUMENT

Patent Document

Patent Document 1: WO 2011/121861 Pamphlet

SUMMARY

In the conventional power transmission device described above, however, the reservoir plate is difficult to be completely tightly attached to the inner circumferential surface of the rib member, and a gap is also formed between the reservoir plate and the inner surface of the case. The conventional power transmission device may fail to sufficiently suppress entry of the oil in the storage chamber into the differential chamber through the gap between the reservoir plate and the rib member and through the gap between the reservoir plate and the inner surface of the case, and thus, may fail to reduce stirring resistance of the oil acting on the ring gear of the differential device.

Thus, it is a primary object of the present disclosure to further reduce the stirring resistance of the hydraulic oil acting on the differential ring gear by more effectively suppressing entry of the hydraulic oil into the differential chamber in which the differential ring gear and the differential gear are arranged.

In the power transmission device according to the present disclosure, the following means is employed to achieve the above primary object.

A power transmission device according to the present disclosure including:

a differential ring gear that is arranged below a drive pinion gear on an input side and meshes with the drive pinion gear, a differential gear connected to the differential ring gear, a case accommodating the differential ring gear and the differential gear, and a dividing member that divides an inside of the case into a differential chamber in which the differential ring gear and the differential gear are arranged and a hydraulic oil storage chamber that stores hydraulic oil, wherein the dividing member includes a cylindrical portion and a flange portion, the cylindrical portion covering a part of the differential gear, the flange portion radially extending from the cylindrical portion, the cylindrical portion is integrally formed with the flange portion, and an outer circumferential edge of the flange portion is provided with a seal portion that extends along an inner circumferential surface of the case and suppresses entry of the hydraulic oil from the hydraulic oil storage chamber into the differential chamber.

In the power transmission device, the dividing member which divides the inside of the case into the differential chamber and the hydraulic oil storage chamber includes the cylindrical portion and the flange portion, the cylindrical portion covering a part of the differential gear, the flange portion radially extending from the cylindrical portion. The cylindrical portion is integrally formed with the flange portion. The outer circumferential edge of the flange portion includes the seal portion that extends along the inner circumferential surface of the case and suppresses entry of the hydraulic oil from the hydraulic oil storage chamber into the differential chamber. This structure forms no clearance between the cylindrical portion and the flange portion, so that the hydraulic oil does not flow into the differential chamber through the boundary between the cylindrical portion and the flange portion. The seal portion between the case and the outer circumferential edge of the flange portion suppresses entry of the hydraulic oil from the hydraulic oil storage chamber into the differential chamber. As a result, in the power transmission device, it is possible to more effectively suppress entry of the hydraulic oil into the differential chamber in which the differential ring gear and the differential gear are arranged, and the stirring resistance of the hydraulic oil acting on the differential ring gear can be further reduced.

The seal portion may be provided by elastically pressing the outer circumferential edge of the flange portion onto the case. This can more easily and more effectively suppress entry of the hydraulic oil from the hydraulic oil storage chamber into the differential chamber, without separately attaching a seal member to the outer circumferential edge of the flange portion.

Moreover, the flange portion may include at least one curved portion extending along the outer circumferential edge between the outer circumferential edge and the cylindrical portion, and the outer circumferential edge of the flange portion may be elastically pressed onto the case by elastic deformation of the curved portion.

The seal portion may be a seal member provided between the case and the outer circumferential edge of the flange portion.

Moreover, the dividing member may include a differential ring surrounding portion that extends from the outer circumferential edge of the flange portion so that a part of the differential ring gear is covered from above without interfering with the drive pinion gear. The differential ring surrounding portion may be integrally formed with the cylindrical portion and the flange portion. The seal portion may be provided at least in a range below the differential ring surrounding portion. This structure forms no clearance between the differential ring surrounding portion and the flange portion, so that the hydraulic oil does not flow into the differential chamber through the boundary between the differential ring surrounding portion and the flange portion. The seal portion in the range below the differential ring surrounding portion suppresses entry of the hydraulic oil from the hydraulic oil storage chamber into the differential chamber. As a result, it is possible to still more effectively suppress entry of the hydraulic oil into the differential chamber.

The differential ring surrounding portion may include at least one opening. This allows the hydraulic oil flowing into the differential chamber to be raked up by the differential ring gear and be discharged out of the differential chamber from the opening of the differential ring surrounding portion. In such a structure, by providing the seal portion in the range of the outer circumferential edge of the flange portion below the differential ring surrounding portion, the seal portion can suppress re-entry of the hydraulic oil, which has been discharged from the opening toward the hydraulic oil storage chamber, into the differential chamber through the clearance between the outer circumferential edge of the flange portion and the case, so that simply using the rake-up operation performed by the differential ring gear can highly effectively suppress stay of the hydraulic oil in the differential chamber.

Moreover, the differential ring surrounding portion may include a projection that projects from an outer circumferential surface of the differential ring surrounding portion along an edge of the differential ring surrounding portion extending in the axial direction of the differential ring gear below the opening. With this structure, the projection can effectively suppress re-entry of the hydraulic oil, which has been raked up by the differential ring gear and discharged out of the differential chamber through the opening of the differential ring surrounding portion, through near the edge of the differential ring surrounding portion into the differential chamber.

The projection may extend to the outer circumferential edge of the flange portion so as to slope downward as the projection approaches the hydraulic oil storage chamber. This allows the projection to effectively guide the hydraulic oil discharged out of the differential chamber through the opening, toward the hydraulic oil storage chamber.

Moreover, the edge of the differential ring surrounding portion extending in the axial direction of the differential ring gear below the opening may be provided with a seal portion that extends along the inner circumferential surface of the case and suppresses entry of the hydraulic oil into the differential chamber. With this structure, the seal portion can effectively suppress re-entry of the hydraulic oil, which has been raked up by the differential ring gear and discharged out of the differential chamber through the opening of the differential ring surrounding portion, through near the edge of the differential ring surrounding portion into the differential chamber.

BRIEF DESCRIPTION OF THE DRAWINGS

FIG. 2 is an operation table showing relations of each shift speed of an automatic transmission 25 with operating states of clutches and brakes thereof included in the power transmission device 20 of FIG. 1.

DETAILED DESCRIPTION OF THE PREFERRED EMBODIMENTS

The following describes modes for carrying out the present disclosure with reference to the drawings.

Figure 1:
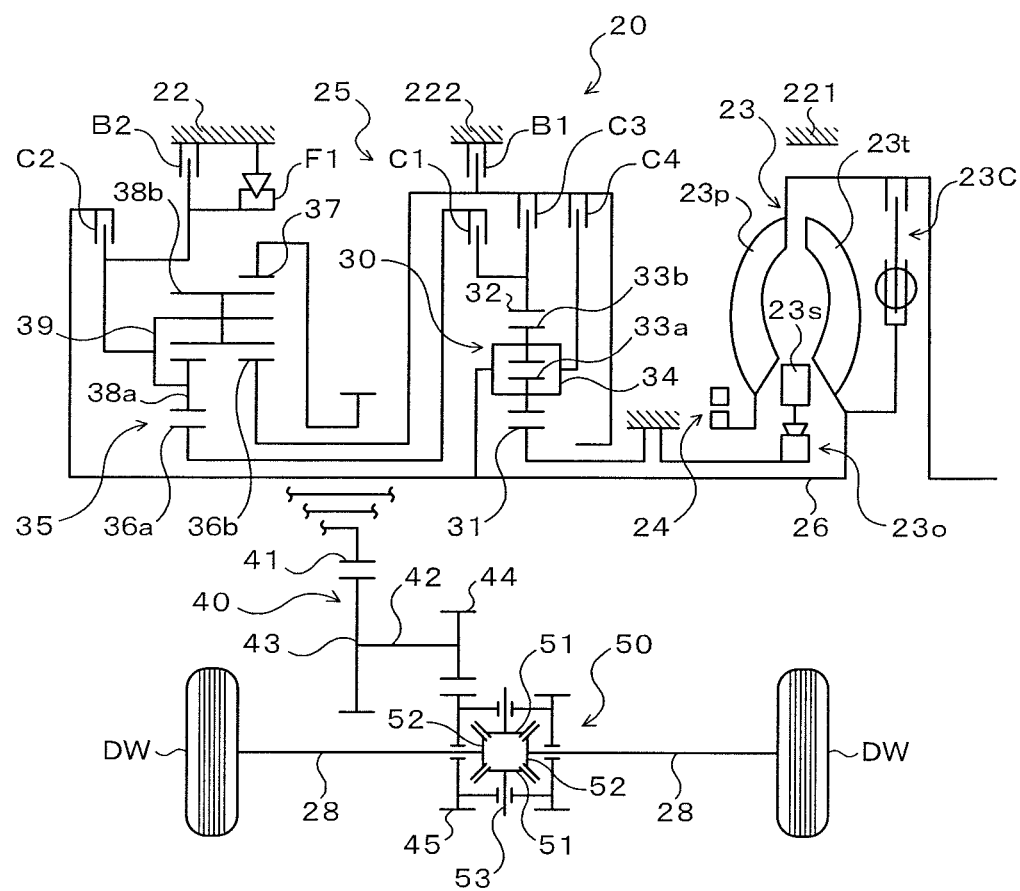
FIG. 1 is a schematic structure diagram of a power transmission device 20 according to the present disclosure.

FIG. 1 is a schematic structure diagram of a power transmission device 20 according to the present disclosure. The power transmission device 20 shown in FIG. 1 is connected to a crankshaft of an engine (not shown) mounted on a front-wheel-drive vehicle, and can transmit power from the engine to right and left driving wheels (front wheels) DW. As shown in FIG. 1, the power transmission device 20 includes, for example, a transmission case 22 including a converter housing 221 (first case) and a transaxle case 222 (second case) connected to the converter housing 221, a fluid transmission apparatus (starting device) 23 and an oil pump 24 that are accommodated in the converter housing 221, and an automatic transmission 25, a gear mechanism (gear train) 40, and a differential gear (differential mechanism) 50 that are accommodated in the transaxle case 222.

The fluid transmission apparatus 23 is structured as a torque converter that includes, for example, a pump impeller 23$p$ on the input side connected to the crankshaft of the engine; a turbine runner 23$t$ on the output side connected to an input shaft 26 of the automatic transmission 25; a stator 23$s$ that is arranged inside the pump impeller 23$p$ and the turbine runner 23$t$, and regulates the flow of hydraulic oil from the turbine runner 23t to the pump impeller 23p; a one-way clutch 23o that restricts the direction of rotation of the stator 23s to one direction; and a lock-up clutch 23c. The fluid transmission apparatus 23 may, however, be structured as a fluid coupling that does not include the stator 23s.

The oil pump 24 is structured as a gear pump that includes a pump assembly including a pump body and a pump cover, and also includes an external gear connected to the pump impeller 23p of the fluid transmission apparatus 23 via a hub. By being driven by the power from the engine, the oil pump 24 suctions the hydraulic oil (ATF) stored in an oil pan (not shown), and feeds the hydraulic oil with pressure to a hydraulic pressure control device (not shown).

The automatic transmission 25 is structured as an eight-speed transmission, and, as shown in FIG. 1, includes a double-pinion type first planetary gear mechanism 30, a Ravigneaux type second planetary gear mechanism 35, four clutches C1, C2, C3, and C4 and two brakes B1 and B2 for changing a power transmission path from the input side to the output side, and a one-way clutch F1.

The first planetary gear mechanism 30 includes a sun gear 31 that is an external gear, a ring gear 32 that is an internal gear arranged concentrically with the sun gear 31, and a planetary carrier 34 that spinnably and revolvably holds a plurality of sets of two pinion gears 33a and 33b meshing with each other, and one of which meshing with the sun gear 31 while the other of which meshing with the ring gear 32. As shown in FIG. 1, the sun gear 31 of the first planetary gear mechanism 30 is fixed to the transmission case 22, and the planetary carrier 34 of the first planetary gear mechanism 30 is connected so as to be rotated together with the input shaft 26. The first planetary gear mechanism 30 is structured as what is called a reduction gear, reducing the speed of the power transmitted to the planetary carrier 34 serving as an input element, and outputting the power with reduced speed from the ring gear 32 serving as an output element.

The second planetary gear mechanism 35 includes a first sun gear 36a and a second sun gear 36b that are external gears; a ring gear 37 that is an internal gear arranged concentrically with the first and the second sun gears 36a and 36b; a plurality of short pinion gears 38a meshing with the first sun gear 36a; a plurality of long pinion gears 38b meshing with the second sun gear 36b and the plurality of short pinion gears 38a, and also with the ring gear 37; and a planetary carrier 39 that spinnably (rotatably) and revolvably holds the plurality of short pinion gears 38a and the plurality of long pinion gears 38b. The ring gear 37 of the second planetary gear mechanism 35 serves as an output member of the automatic transmission 25, and the power transmitted from the input shaft 26 to the ring gear 37 is transmitted to the right and left driving wheels via the gear mechanism 40, the differential gear 50, and drive shafts 28. The planetary carrier 39 is supported by the transmission case 22 via the one-way clutch F1, and the direction of rotation of the planetary carrier 39 is restricted to one direction by the one-way clutch F1.

The clutch C1 is a multi-plate friction hydraulic clutch (friction engagement element) that includes a hydraulic servo constituted by, for example, a piston, a plurality of friction plates and mating plates, and an oil chamber supplied with the hydraulic oil, and that can join the ring gear 32 of the first planetary gear mechanism 30 with the first sun gear 36a of the second planetary gear mechanism 35 and can release the joint therebetween. The clutch C2 is a multi-plate friction hydraulic clutch that includes a hydraulic servo constituted by, for example, a piston, a plurality of friction plates and mating plates, and an oil chamber supplied with the hydraulic oil, and that can join the input shaft 26 with the planetary carrier 39 of the second planetary gear mechanism 35 and can release the joint therebetween. The clutch C3 is a multi-plate friction hydraulic clutch that includes a hydraulic servo constituted by, for example, a piston, a plurality of friction plates and mating plates, and an oil chamber supplied with the hydraulic oil, and that can join the ring gear 32 of the first planetary gear mechanism 30 with the second sun gear 36b of the second planetary gear mechanism 35 and can release the joint therebetween. The clutch C4 is a multi-plate friction hydraulic clutch that includes a hydraulic servo constituted by, for example, a piston, a plurality of friction plates and mating plates, and an oil chamber supplied with the hydraulic oil, and that can join the planetary carrier 34 of the first planetary gear mechanism 30 with the second sun gear 36b of the second planetary gear mechanism 35 and can release the joint therebetween.

The brake B1 is a hydraulic brake (friction engagement element) that is structured as a band brake or a multi-plate friction brake including a hydraulic servo, and that can non-rotatably fix the second sun gear 36b of the second planetary gear mechanism 35 to the transmission case 22 and can release the fixation of the second sun gear 36b to the transmission case 22. The brake B2 is a hydraulic brake that is structured as a band brake or a multi-plate friction brake including a hydraulic servo, and that can non-rotatably fix the planetary carrier 39 of the second planetary gear mechanism 35 to the transmission case 22 and can release the fixation of the planetary carrier 39 to the transmission case 22. The one-way clutch F1 includes, for example, an inner race, an outer race, and a plurality of sprags, and transmits torque via the sprags when the outer race rotates relative to the inner race in one direction while allowing the inner and the outer races to rotate relative to each other when the outer race rotates relative to the inner race in the other direction. The one-way clutch F1 may, however, have a structure, such as a roller clutch structure, other than the sprag clutch structure.

The clutches C1 to C4 and the brakes B1 and B2 operate in response to supply and discharge of the hydraulic oil by the hydraulic pressure control device (not shown). FIG. 2 shows an operation table representing relations of each shift speed of the automatic transmission 25 with each of the operating states of the clutches C1 to C4, the brakes B1 and B2, and the one-way clutch F1. The automatic transmission 25 places the clutches C1 to C4 and the brakes B1 and B2 in the states shown in the operation table of FIG. 2 so as to provide first to eighth forward shift speeds and first and second reverse shift speeds. At least one of the clutches C1 to C4 and the brakes B1 and B2 may be a meshing engagement element, such as a dog clutch.

The gear mechanism 40 includes a counter drive gear 41 connected to the ring gear 37 of the second planetary gear mechanism 35 of the automatic transmission 25; a counter driven gear 43 that is fixed to a countershaft 42 extending in parallel with the input shaft 26 of the automatic transmission 25 and meshes with the counter drive gear 41; a drive pinion gear (final drive gear) 44 formed on (or fixed to) the countershaft 42; and a differential ring gear (final driven gear) 45 that is arranged below the drive pinion gear 44 (refer to FIG. 3) and meshes with the drive pinion gear 44. The differential ring gear 45 is structured as a helical gear.

As shown in FIGS. 1 and 5 to 8, the differential gear 50 includes a pair of (two) pinion gears 51; a pair of (two) side gears 52, each fixed to corresponding one of the drive shafts 28 and orthogonally meshing with corresponding one of the pair of pinion gears 51; a pinion shaft 53 supporting the pair of pinion gears 51; and a differential case 54 that accommodates the pair of pinion gears 51 and the pair of side gears 52 and is connected (fixed) to the differential ring gear 45. In the present embodiment, each of the pinion gears 51 and the side gears 52 is structured as a straight bevel gear. A pinion washer 55 is interposed between each of the pinion gears 51 and the differential case 54, and a side washer 56 is interposed between each of the side gears 52 and the differential case 54. The differential case 54 is supported by the transmission case 22 via bearings 81 and 82 so as to be rotatable coaxially with the drive shafts 28.

Figure 3:
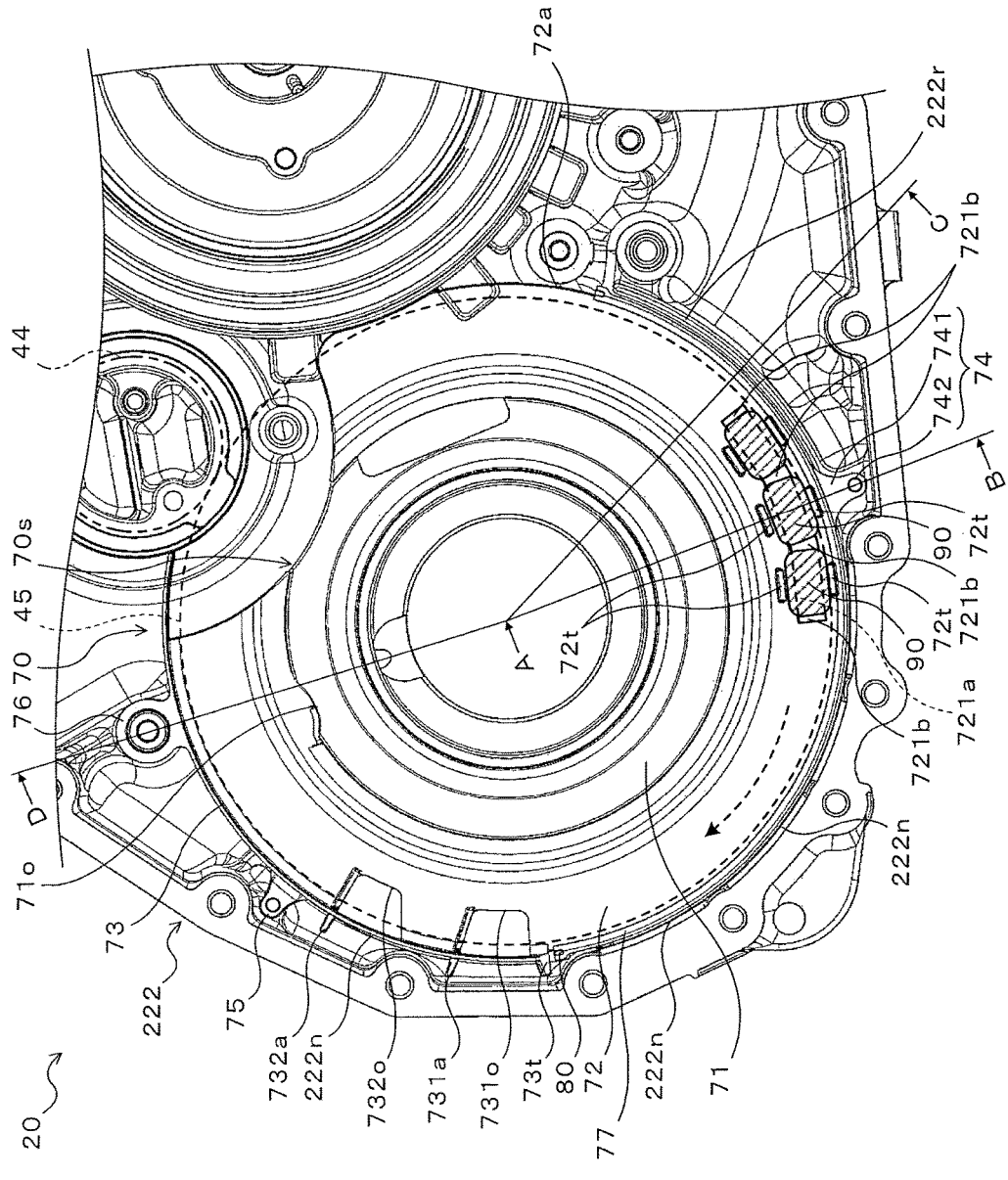
FIG. 3 is an explanatory diagram showing the inside of a transaxle case 222.
Figure 4:
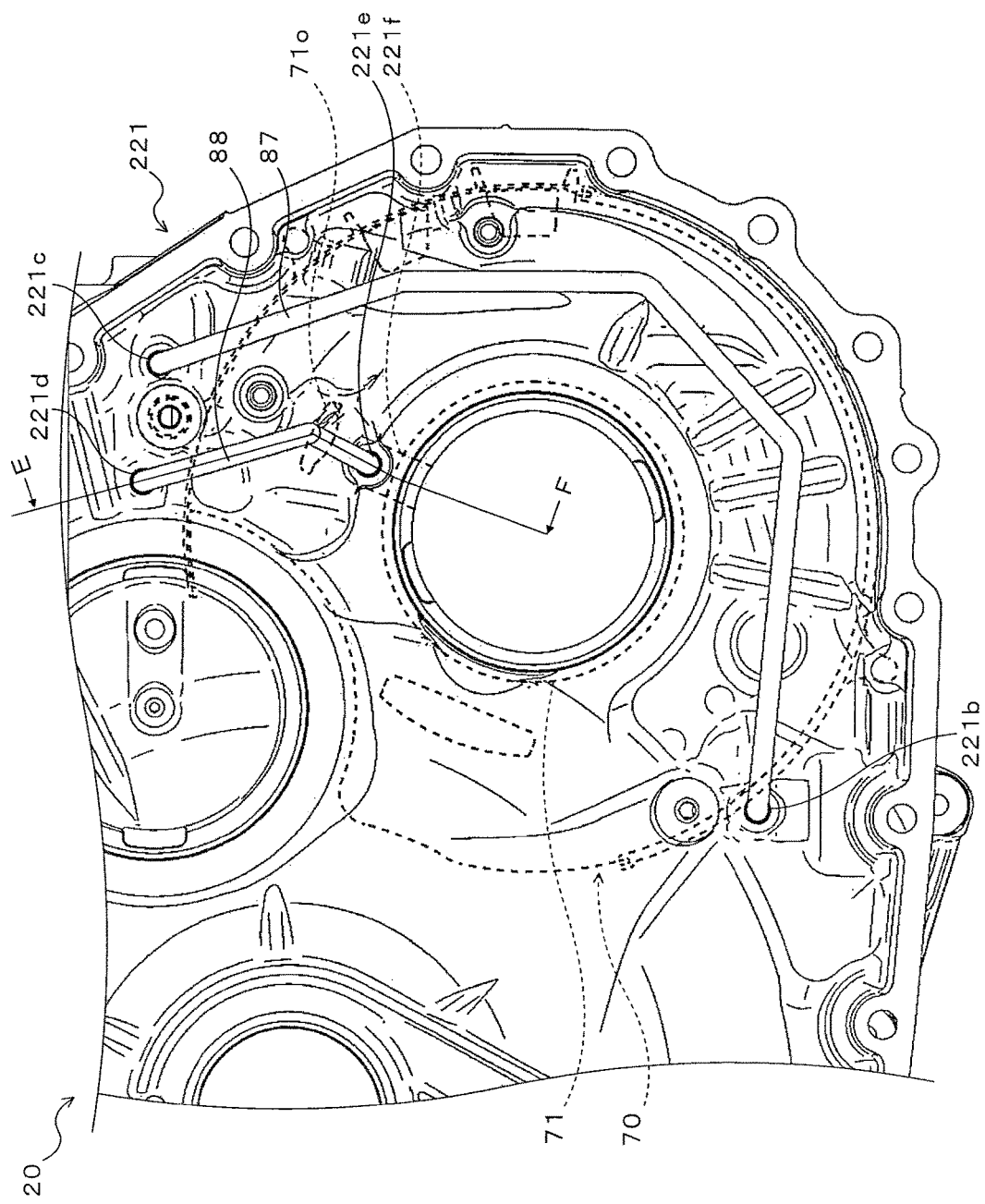
FIG. 4 is an explanatory diagram showing the inside of a converter housing 221.
Figure 5:
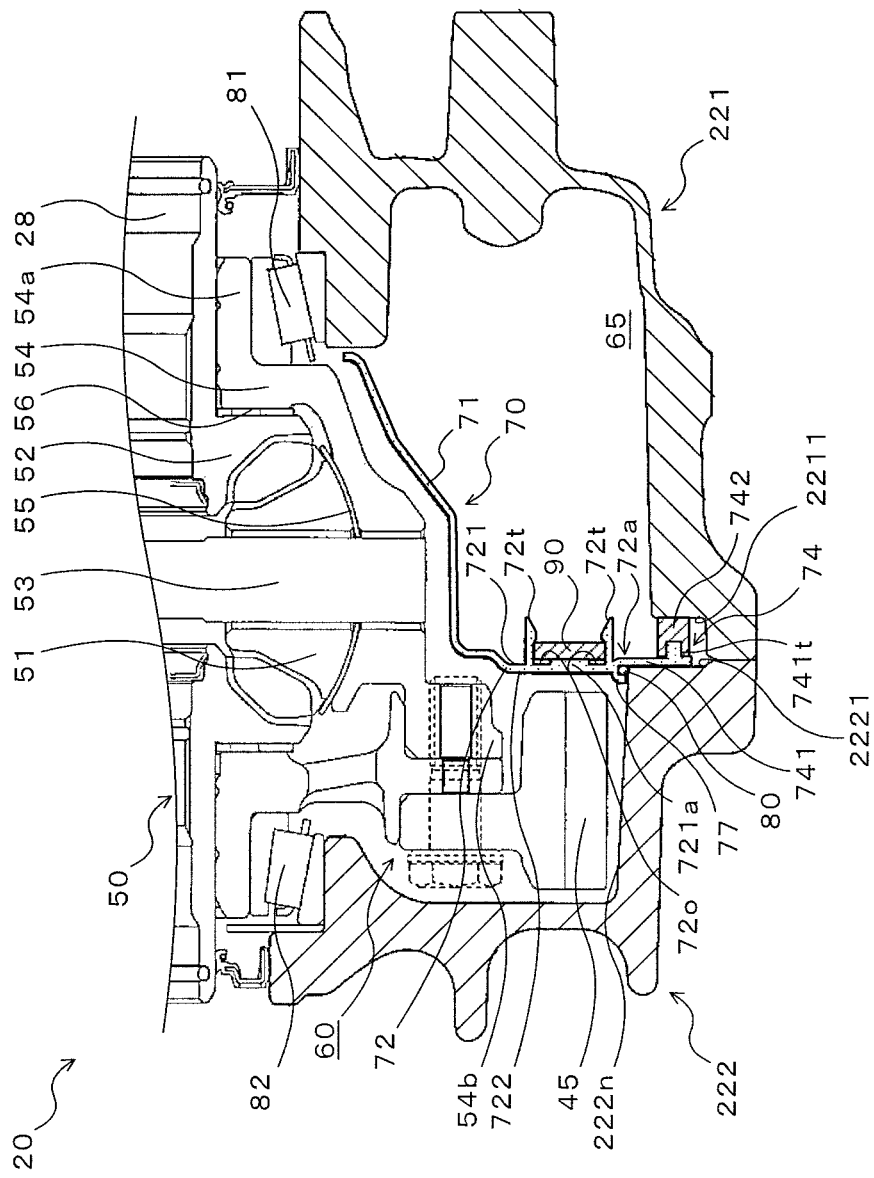
FIG. 5 is a partial sectional view taken along line A-B in FIG. 3.
Figure 6:
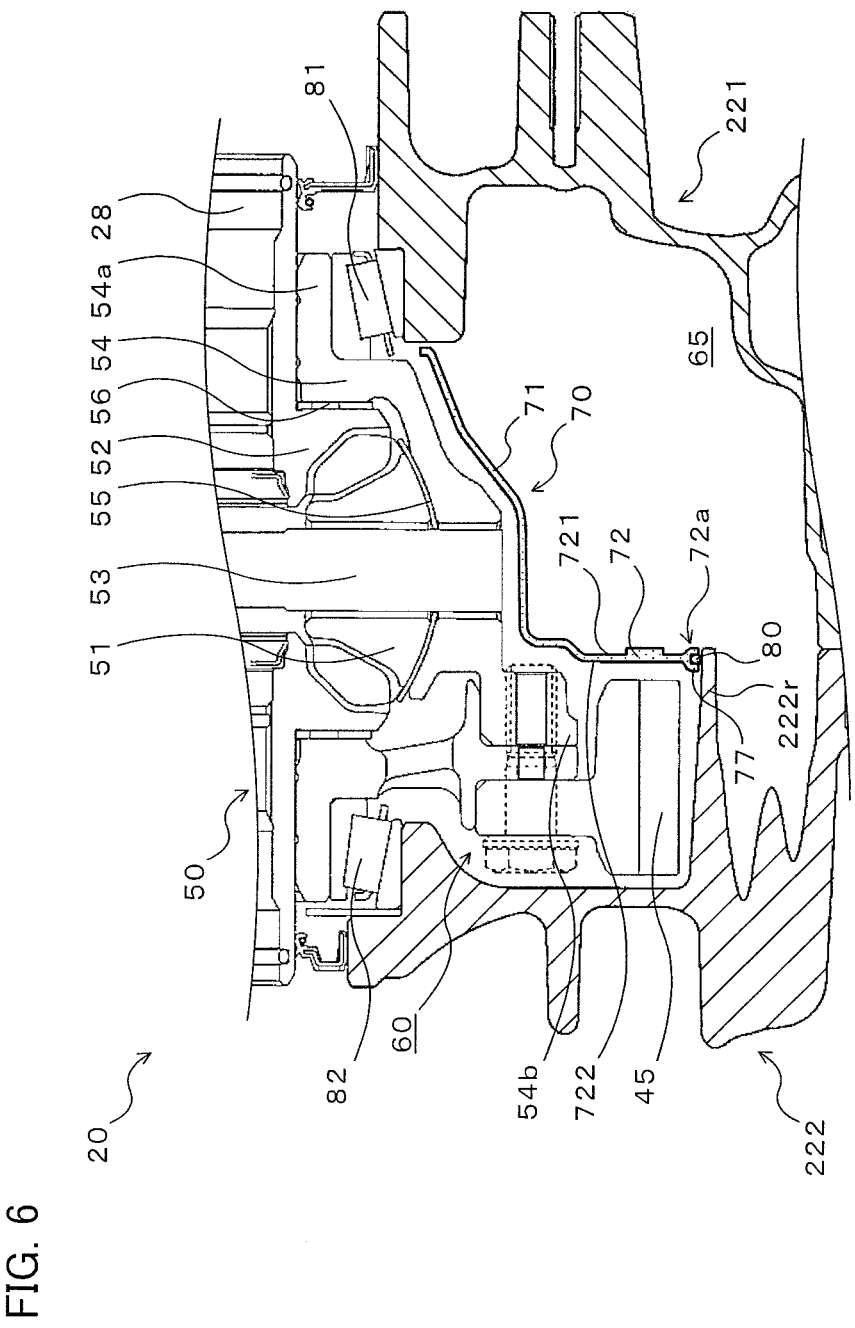
FIG. 6 is a partial sectional view taken along line A-C in FIG. 3.
Figure 7:
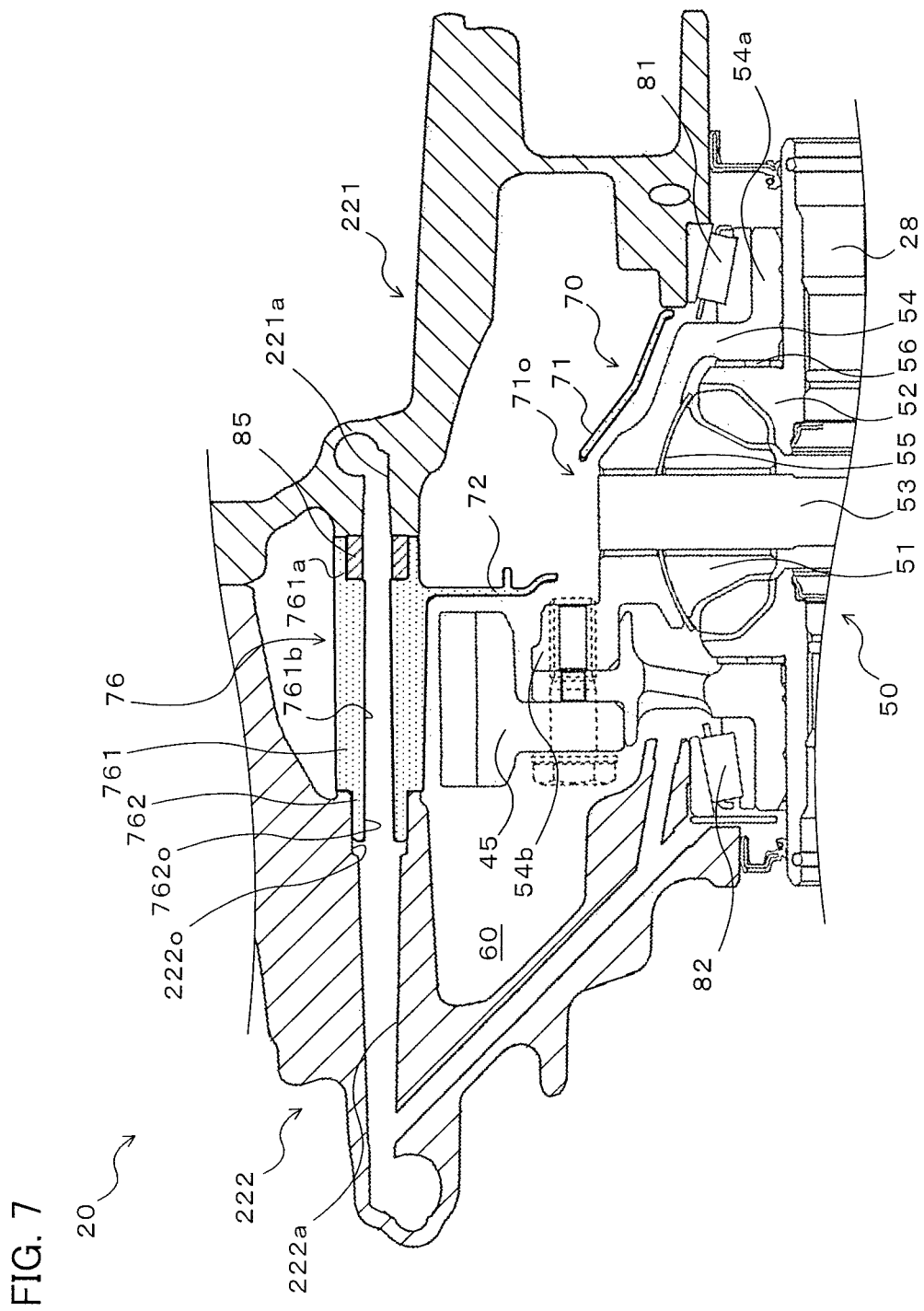
FIG. 7 is a partial sectional view taken along line D-A in FIG. 3.
Figure 8:
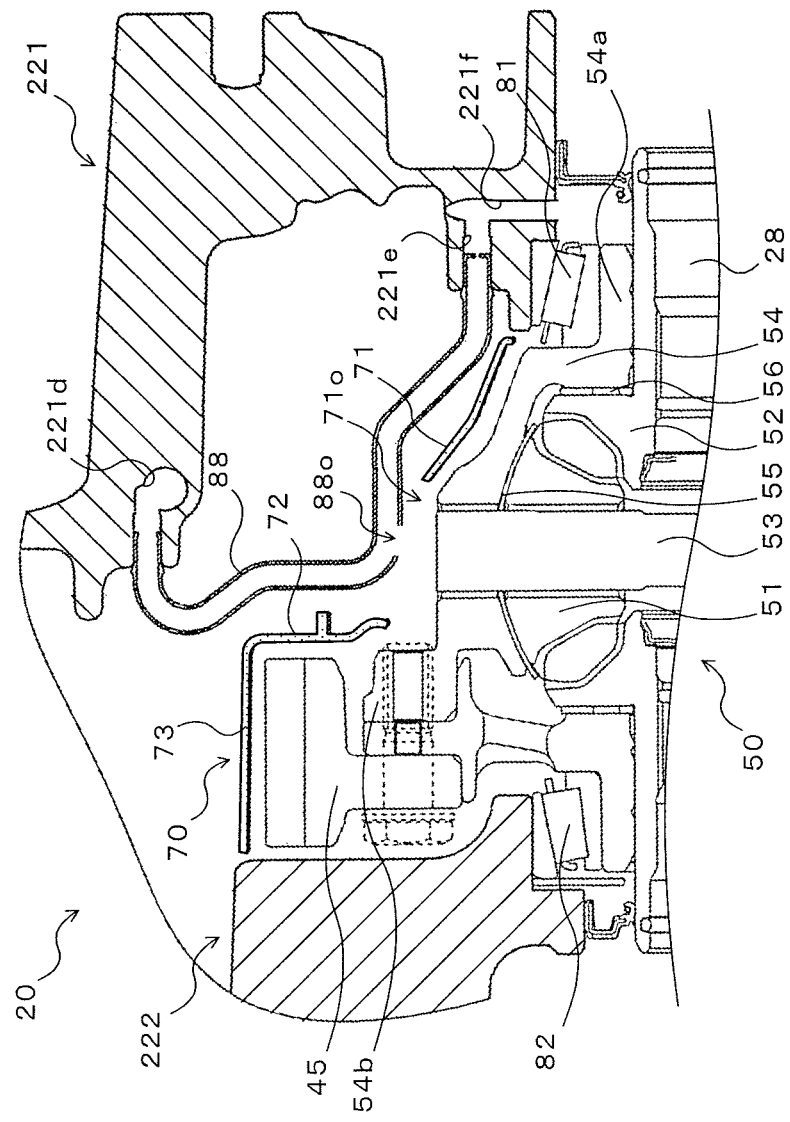
FIG. 8 is a partial sectional view taken along line E-F in FIG. 4.

Subsequently, the following describes the structure in the vicinity of the differential ring gear 45 and the differential gear 50 in the power transmission device 20. FIG. 3 is an explanatory diagram showing the inside of the transaxle case 222. FIG. 4 is an explanatory diagram showing the inside of the converter housing 221. FIG. 5 is a sectional view taken along line A-B in FIG. 3. FIG. 6 is a sectional view taken along line A-C in FIG. 3. FIG. 7 is a sectional view taken along line D-A in FIG. 3. FIG. 8 is a sectional view taken along line E-F in FIG. 4. As shown in these drawings, the inside of the transmission case 22 including the converter housing 221 and the transaxle case 222 is divided by the reservoir plate 70 shown in FIGS. 9, 10, and 11 into a differential chamber 60 in which the differential ring gear 45 and the differential gear 50 are arranged and a hydraulic oil storage chamber 65 that stores the hydraulic oil. In the following description, the terms "upper", "upward, or "above" and "lower", "downward", or "below" indicate "upper", "upward, or "above" and "lower", "downward", or "below", respectively, in the vertical direction in the state in which the power transmission device 20 is mounted on the vehicle.

Figure 9:
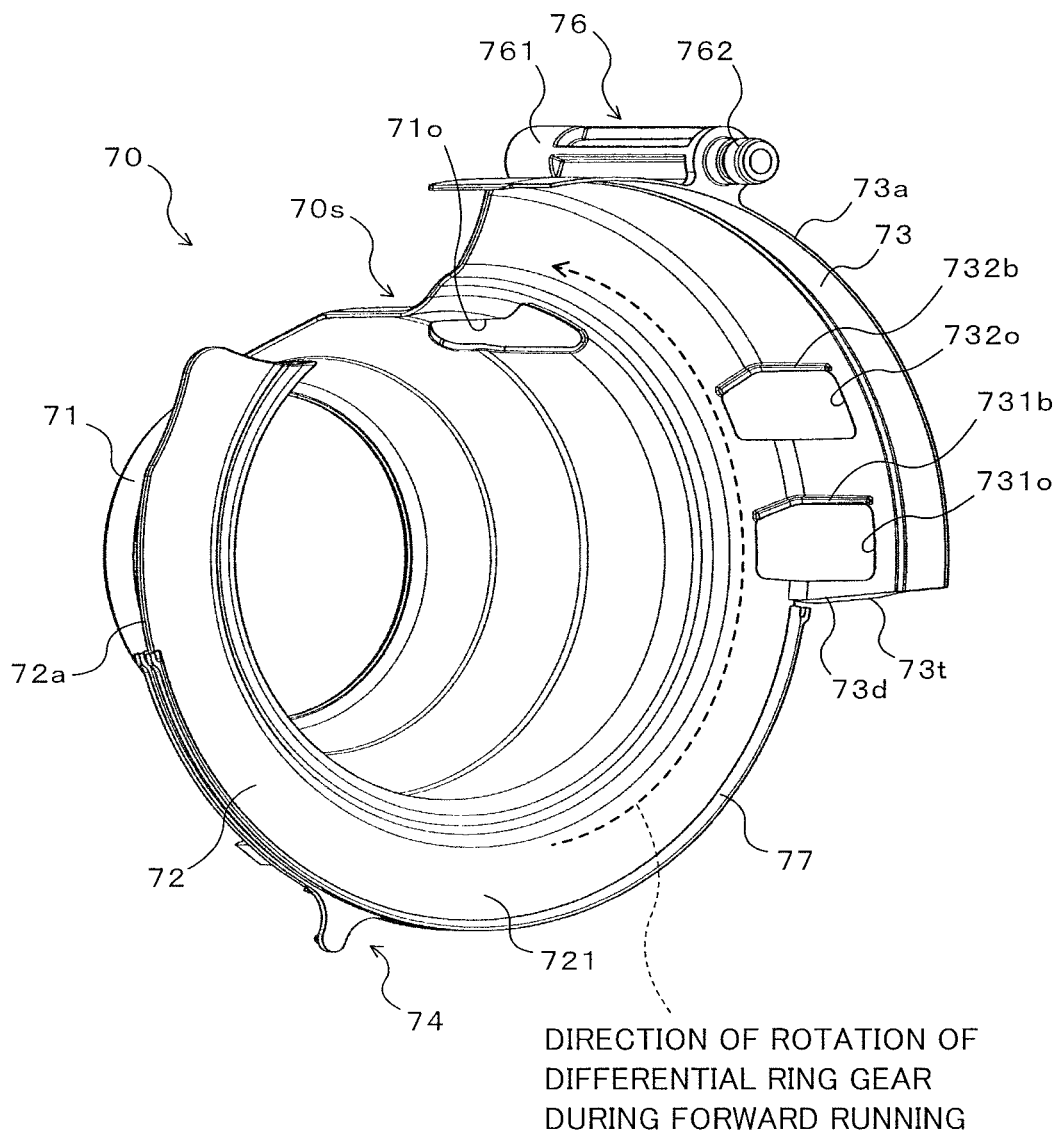
FIG. 9 is a perspective view showing a reservoir plate 70.
Figure 10:
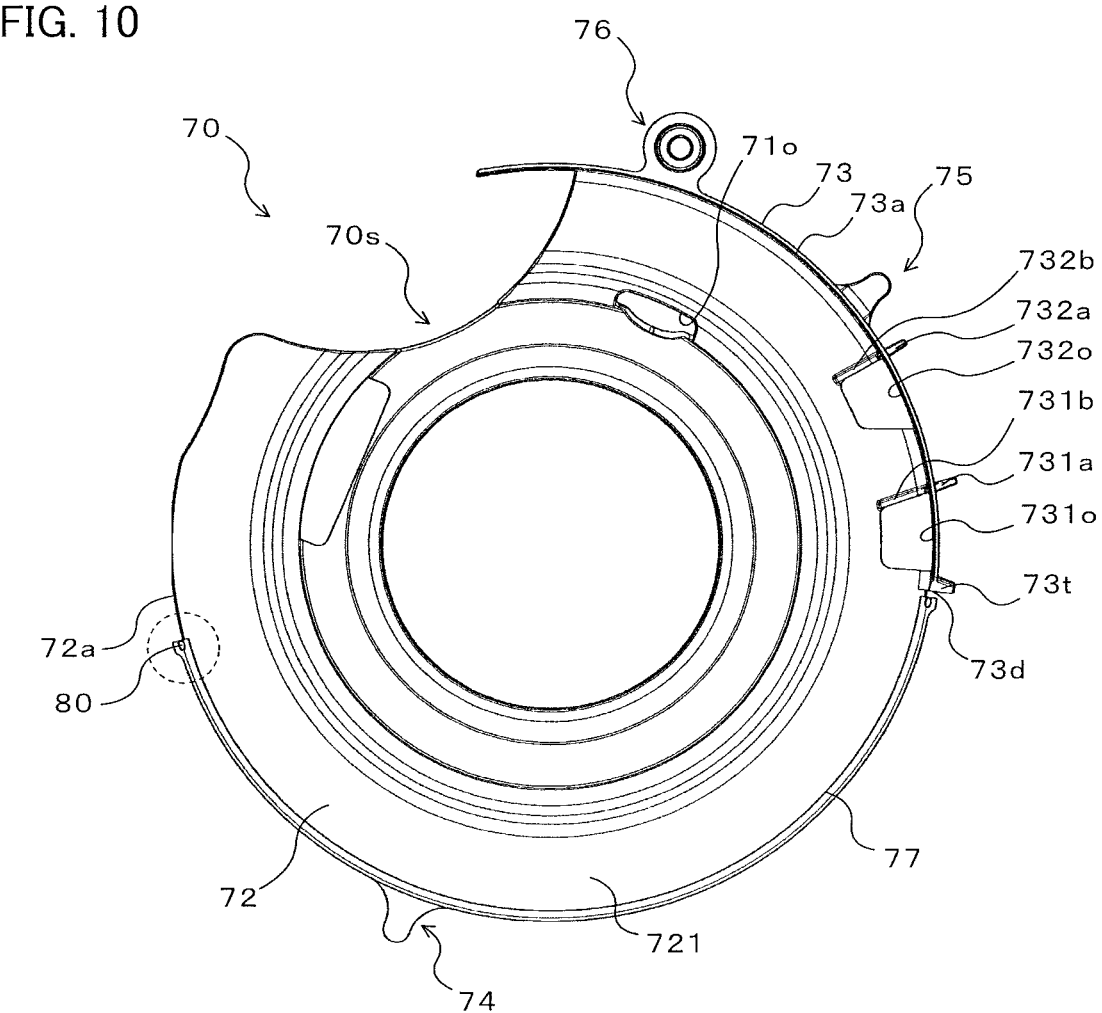
FIG. 10 is a front view showing the reservoir plate 70.
Figure 11:
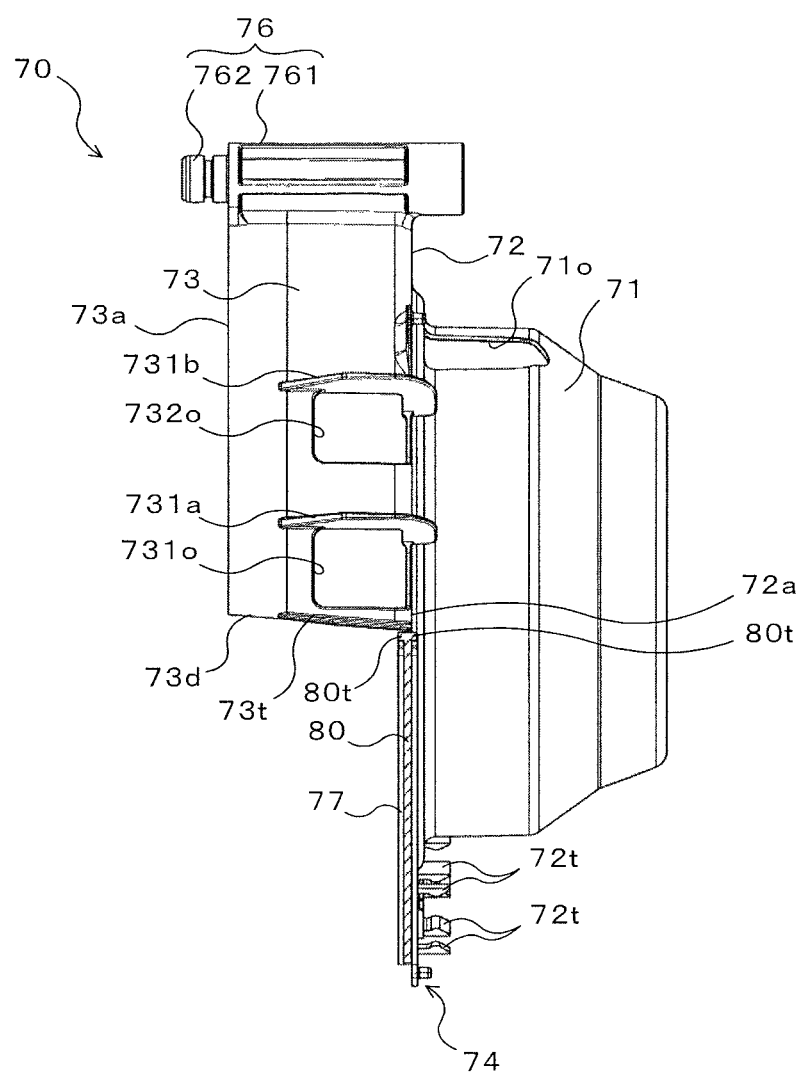
FIG. 11 is a side view showing the reservoir plate 70.

As shown in FIGS. 9 to 11, the reservoir plate 70 includes a cylindrical portion 71, a flange portion 72 extending radially outward from the cylindrical portion 71, and a differential ring surrounding portion 73 extending from an outer circumferential edge 72a of the flange portion 72, and is fixed to the transmission case 22. The reservoir plate 70 constituted by the cylindrical portion 71, the flange portion 72, and the differential ring surrounding portion 73 is integrally formed of a resin. The reservoir plate 70 may, however, be formed of a material different from a resin.

As shown in FIGS. 5 to 8, the cylindrical portion 71 is formed so as to extend along a part of the outer circumferential surface of the differential case 54 of the differential gear 50, and mainly surrounds a portion of the differential case 54 except a side gear support portion (portion supported by the converter housing 221 via a bearing) 54a on one side of the differential case 54 and a differential ring gear mounting portion 54b. A slight clearance is defined between an end on the converter housing 221 side of the cylindrical portion 71 and the converter housing 221 in the state in which the reservoir plate 70 is fixed to the transmission case 22. As shown in FIGS. 7 and 9 to 11, an opening 710 that opens above the pinion shaft 53 of the differential gear 50 is formed in the cylindrical portion 71.

The flange portion 72 extends radially outward from an end on the transaxle case 222 side of the cylindrical portion 71. A cutout 70s is formed at upper parts of the flange portion 72 and the cylindrical portion 71 so as to avoid interference with a bearing (not shown) rotatably supporting the countershaft 42. As a result, the flange portion 72 extends in a circular arc shape (substantially in a C-shape) around the cylindrical portion 71. In the present embodiment, the transaxle case 222 includes an inner circumferential surface 222n extending in a circular arc shape along the outer circumference of the differential ring gear 45 (refer to the dashed line in FIG. 3), and also includes a circular arc-shaped rib portion 222r that is formed so as to have an inner circumferential surface having the same curvature radius as that of the inner circumferential surface 222n and that surrounds a part of the differential ring gear 45. The reservoir plate 70 is fixed to the transmission case 22 so that the outer circumferential edge 72a of the flange portion 72 extends along the inner circumferential surface 222n and the inner circumferential surface of the rib portion 222r. In the state in which the reservoir plate 70 is fixed to the transmission case 22, a slight clearance is defined between the outer circumferential edge 72a of the flange portion 72 and the inner circumferential surface 222n of the transaxle case 222 and between the outer circumferential edge 72a and the inner circumferential surface of the rib portion 222r.

The differential ring surrounding portion 73 axially extends from the outer circumferential edge 72a of the flange portion 72 toward the side opposite to the cylindrical portion 71 so as to cover substantially a quarter of the outer circumferential surface of the differential ring gear 45 from above. Specifically, when viewed from the lowest point of the reservoir plate 70, the differential ring surrounding portion 73 is provided on the downstream side in the direction of rotation of the differential ring gear 45 during the forward running of the vehicle equipped with the power transmission device 20 (in the direction of the dashed-line arrow in each of FIGS. 3 and 9). As shown in FIG. 3, the differential ring surrounding portion 73 extends to the vicinity of the meshing portion between the drive pinion gear 44 and the differential ring gear 45 so as to cover a part of the cutout 70s without interfering with the drive pinion gear 44 (refer to the chain double-dashed line in FIG. 3). The reservoir plate 70 is fixed to the transmission case 22 so that the outer circumferential edge 73a of the differential ring surrounding portion 73 extends along the inner circumferential surface 222n of the transaxle case 222 extending in a circular arc shape. In the state in which the reservoir plate 70 is fixed to the transmission case 22, a (slight) clearance similar to that defined between the outer circumferential edge 72a of the flange portion 72 and, for example, the inner circumferential surface 222n is also defined between the outer circumferential edge 73a of the differential ring surrounding portion 73 and the inner circumferential surface 222n.

In addition, two openings 731o and 732o are formed in the differential ring surrounding portion 73 and the flange portion 72 so as to be arranged side by side along the circumferential direction, as shown in FIGS. 9 to 11. The openings 731o and 732o are formed so as to extend from substantially the central part in the axial direction of the differential ring surrounding portion 73 to substantially the central part in the radial direction of the flange portion 72. Outer circumferential side projections 731a and 732a are provided on the outer circumferential surface of the differential ring surrounding portion 73 and the outer surface of the flange portion 72 so as to project radially outward along edges on the upper sides of the openings 731o and 732o. Inner circumferential side projections 731b and 732b are provided on the inner circumferential surface of the differential ring surrounding portion 73 and the inner surface of the flange portion 72 so as to project radially inward along the edges on the upper sides of the openings 731o and 732o.

A projection 73t is provided on the outer circumferential surface of the differential ring surrounding portion 73 so as to project radially outward along a lower edge 73d extending in the axial direction below the openings 731o and 732o. As shown in FIG. 11, the projection 73*t* extends to the outer circumferential edge 72*a* of the flange portion 72 so as to slope downward (downward in FIG. 11) as the projection 73*t* approaches the hydraulic oil storage chamber 65 (the cylindrical portion 71, that is, the right side in FIG. 11). Recesses (grooves) are formed on the inner circumferential surface 222*n* of the transaxle case 222 in positions corresponding to the outer circumferential side projections 731*a* and 732*a* and the projection 73*t* so that interference with the outer circumferential side projections 731*a* and 732*a* and the projection 73*t* is avoided.

The reservoir plate 70 includes a first fixing portion 74, a second fixing portion 75, and a third fixing portion 76 to be fixed to the transmission case 22. As shown in FIGS. 3 and 5, the first fixing portion 74 includes a base 741 extending radially outward from the outer circumferential edge 72*a* of the flange portion 72 and an elastic member 742 fixed to the base 741. As shown in FIG. 5, a projection 741*t* projecting toward the converter housing 221 (rightward in FIG. 5) is provided on the base 741, and the elastic member 742 is fixed by press fitting to the projection 741*t*. The reservoir plate 70 is arranged in the transmission case 22 such that the base 741 of the first fixing portion 74 abuts on a stepped portion 2221 provided on the transaxle case 222, and the elastic member 742 of the first fixing portion 74 abuts on a stepped portion 2211 provided on the converter housing 221. In the present embodiment, the second fixing portion 75 has the same structure as that of the first fixing portion 74.

As shown in FIGS. 9 to 11, the third fixing portion 76 includes a cylindrical portion 761 that projects radially outward from the outer circumferential surface of the differential ring surrounding portion 73 and extends in the axial direction, and also includes a fitting portion 762 that extends from an end of the cylindrical portion 761 on the side opposite to the cylindrical portion 71 and has a diameter smaller than that of the cylindrical portion 761. As shown in FIG. 7, the cylindrical portion 761 and the fitting portion 762 of the third fixing portion 76 are formed to be hollow, and the cylindrical portion 761 includes a first hollow portion 761*a* located on the side of the converter housing 221 and a second hollow portion 761*b* that extends from the first hollow portion 761*a* toward the fitting portion 762 and has a diameter smaller than that of the first hollow portion 761*a*. An elastic member 85 having a through-hole 85*o* formed so as to communicate with the second hollow portion 761*b* is fitted in the first hollow portion 761*a*. The fitting portion 762 includes a hollow portion 762*o* formed so as to communicate with the second hollow portion 761*b*. The reservoir plate 70 is arranged in the transmission case 22 such that the elastic member 85 fitted in the cylindrical portion 761 abuts on the converter housing 221, and the fitting portion 762 is fitted in a hole 222*o* formed in the transaxle case 222.

Accordingly, the reservoir plate 70 is supported between the transaxle case 222 and the converter housing 221 via, for example, the elastic members 742 and 85, at the first and the second fixing portions 74 and 75 and the third fixing portion 76. Thus, the reservoir plate 70 is supported between the converter housing 221 and the transaxle case 222 via, for example, the elastic members 742 and 85 of the first to the third fixing portions 74 to 76 so that the reservoir plate 70 can be fixed to the transmission case 22 without using a bolt or the like. As a result, the power transmission device 20 can be assembled more easily.

By being fixed to the transmission case 22 as described above, the reservoir plate 70 divides the inside of the transmission case 22 into the differential chamber 60 and the hydraulic oil storage chamber 65, as shown in FIGS. 5 and 6. A seal member 80 made of, for example, a rubber material is interposed between the outer circumferential edge 72*a* of the flange portion 72 of the reservoir plate 70 and the inner circumferential surface 222*n* of the transaxle case 222 and between the outer circumferential edge 72*a* and the inner circumferential surface of the rib portion 222*r*. In other words, the outer circumferential edge 72*a* of the flange portion 72 is provided with a seal portion that extends along the inner circumferential surface 222*n* of the transaxle case 222 and suppresses entry of the hydraulic oil from the hydraulic oil storage chamber 65 into the differential chamber 60. As shown in FIGS. 9 to 11, the outer circumferential edge 72*a* of the flange portion 72 includes, in a range thereof below the differential ring surrounding portion 73, a seal support portion 77 that can support the seal member 80 (FIG. 9 does not show the seal member 80).

Figure 12:
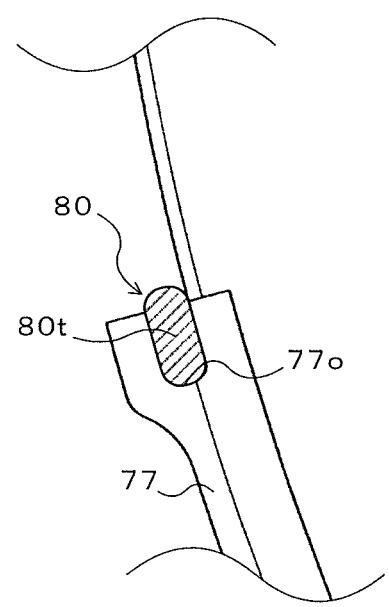
FIG. 12 is an enlarged view showing a portion enclosed by a dashed line in FIG. 10.

As shown in FIGS. 5 and 6, the seal support portion 77 is structured by forming a groove for fitting therein the seal member 80 on the outer circumferential surface of a widened portion formed by slightly projecting side surfaces 721 and 722 on both sides (the differential chamber 60 side and the hydraulic oil storage chamber 65 side) in the axial direction of the reservoir plate 70 near the outer circumferential edge 72*a* of the flange portion 72. In the present embodiment, the seal support portion 77 is provided along the outer circumferential edge 72*a* of the flange portion 72 over substantially the half circumference of the flange portion 72 from near the lower edge 73*d* of the differential ring surrounding portion 73, and an end of the seal support portion 77 on the side opposite to the lower edge 73*d* of the differential ring surrounding portion 73 is located slightly below the differential ring surrounding portion 73 (refer to FIG. 10). As shown in FIG. 12, engaging recesses 77*o* are formed at both ends of the seal support portion 77, and can engage with engaging projections 80*t* formed at both ends of the seal member 80.

The seal member 80 is fitted in the groove of the seal support member 77 so that the engaging projections 80*t* at both ends engage with the engaging recesses 77*o*, and is thus positioned relative to the flange portion 72 of the reservoir plate 70. The reservoir plate 70 in which the seal member 80 is positioned is fixed to the transmission case 22 as described above, so that the seal member 80 is interposed between the outer circumferential edge 72*a* of the flange portion 72 of the reservoir plate 70 and the inner circumferential surface 222*n* of the transaxle case 222 and between the outer circumferential edge 72*a* and the inner circumferential surface of the rib portion 222*r*. This allows the seal member 80 to effectively suppress entry of the hydraulic oil stored in the hydraulic oil storage chamber 65 into the differential chamber 60 through the clearance below the differential ring surrounding portion 73 between the outer circumferential edge 72*a* of the flange portion 72 and the inner circumferential surface 222*n* of the transaxle case 222 and between the outer circumferential edge 72*a* and the inner circumferential surface of the rib portion 222*r*. As described above, the differential ring surrounding portion 73 of the reservoir plate 70 is integrally formed with the flange portion 72, so that no clearance is formed between the differential ring surrounding portion 73 and the flange portion 72, and thus the hydraulic oil does not flow into the differential chamber 60 through the boundary between the differential ring surrounding portion 73 and the flange portion 72.

In the present embodiment, the seal support portion 77 is provided so that the end thereof on the side opposite to the lower edge 73*d* of the differential ring surrounding portion 73 is located slightly below the differential ring surrounding portion 73. The seal support portion 77 may, however, be provided so that the end thereof on the side opposite to the lower edge 73d is located above the differential ring surrounding portion 73. Moreover, the seal support portion 77 may be structured so as to allow the seal member 80 to be interposed between the outer circumferential edge 72a of the flange portion 72 and the inner circumferential surface 222n of the transmission case 22 and between the outer circumferential edge 72a and the rib portion 222r, except in the positions where the differential ring surrounding portion 73 and the cutout 70s are provided.

As shown in FIGS. 3 and 5, a plurality of (three, in the present embodiment) magnets 90 for attracting foreign objects contained in the hydraulic oil are mounted on the side surface 721 on the hydraulic oil storage chamber 65 side of the flange portion 72 of the reservoir plate 70 with spaces therebetween in the circumferential direction. Each of the magnets 90 is held by a pair of claws 72t that are integrally formed with the flange portion 72 so as to project from the side surface 721, and, in the present embodiment, to face each other in the upper-lower direction. The two claws 72t facing each other are each elastically deformable in the upper-lower direction in the FIG. 5, and hold each of the magnets fitted from the side of the cylindrical portion 71 toward the flange portion 72 so that the magnet does not come off.

Accordingly, the magnets 90 can be fixed to the reservoir plate 70. By arranging the reservoir plate 70 in the transmission case 22, the hydraulic oil storage chamber 65 can be defined, and the magnets 90 can be arranged in the hydraulic oil storage chamber 65, so that the magnets 90 can effectively remove the foreign objects contained in the hydraulic oil in the hydraulic oil storage chamber 65. Moreover, even when the reservoir plate 70 is made of a resin that is a nonmagnetic material, each of the magnets 90 can be easily and surely fixed to the reservoir plate 70 by being held by the pair of claws 72t, so that the reservoir plate 70 can be reduced in weight.

As shown in FIGS. 3 and 5, an abutting part 721a is provided on the side surface 721 of the flange portion 72 so as to extend in the circumferential direction between the pair of claws 72t and to project toward the magnets 90. Each of the magnets 90 are held by the pair of claws 72t while abutting on the abutting part 721a. As a result, oil passages 72o allowing flow of the hydraulic oil are formed between the side surface 721 of the flange portion 72 and surfaces on the side surface 721 side of the magnets 90. This structure can attract the foreign objects in the hydraulic oil flowing into the oil passages 72o to the surfaces on the reservoir plate 70 side of the magnets 90 so as to retain the foreign objects in the oil passages 72o. As a result, the foreign objects in the hydraulic oil in the hydraulic oil storage chamber 65 can be more effectively removed. As shown in FIG. 3, a plurality of movement restricting walls 721b are provided on the abutting part 721a so as to abut on a side end surface (end surface on the right side or left side in FIG. 3) of corresponding one of the magnets 90. The movement restricting walls 721b are formed to be at least higher than the abutting part 721a. This structure allows the movement restricting walls 721b to restrict the movement of the magnets 90 in the circumferential direction (circumferential direction of the flange portion 72), and thus can more stably fix the magnets 90 to the reservoir plate 70.

In the present embodiment, as shown in FIG. 3, the first fixing portion 74 of the reservoir plate 70 is provided near the mounting position of the magnets 90, that is, in a position radially outside and circumferentially overlapping the mounting position of the magnets 90. More specifically, the first fixing portion 74 is provided on the outer circumferential side of substantially the central part in the longitudinal direction of the mounting range of the magnets 90, that is, in a position circumferentially overlapping one of the magnets 90 located in the center which is fixed to the mounting position. This arrangement can more effectively suppress the occurrence of local vibration due to the weight of the magnets 90 on the reservoir plate 70 about the first fixing portion 74 as a supporting point during running of the vehicle equipped with the power transmission device 20. As a result, durability of the reservoir plate 70 can be effectively ensured, and oil tightness can also be effectively ensured between the outer circumferential edge 72a of the flange portion 72 of the reservoir plate 70 and the inner circumferential surface 222n of the transaxle case 222 and between the outer circumferential edge 72a and the inner circumferential surface of the rib portion 222r. Moreover, the reservoir plate 70 is supported between the converter housing 221 and the transaxle case 222 via, for example, the elastic members 742 and 85 of the first to the third fixing portions 74 to 76. With this structure, if the weight of the magnets 90 causes the reservoir plate 70 to vibrate, the elastic members 742 and 85 can absorb the vibration. As a result, the durability of the reservoir plate 70 can be more improved.

Subsequently, the following describes an oil passage structure for supplying the hydraulic oil as a lubricating medium or a cooling medium from the hydraulic pressure control device (not shown) to the differential gear 50 and the bearing 82 supporting the differential gear 50. As shown in FIG. 7, an in-housing oil passage 221a is formed in the converter housing 221, the in-housing oil passage 221a being connected to the hydraulic pressure control device (not shown), and communicating with the through-hole 85o of the elastic member 85 fitted in the cylindrical portion 761 of the third fixing portion 76. An in-case oil passage 222a is formed in the transaxle case 222, the in-case oil passage 222a communicating with the hollow portion 762o in the fitting portion 762 of the third fixing portion 76 fitted in the hole 222o. The in-case oil passage 222a opens near the bearing 82 rotatably supporting the differential case 54 of the differential gear 50. This structure allows the hydraulic oil to be supplied from the hydraulic pressure control device (not shown) to the bearing 82 through the in-housing oil passage 221a of the converter housing 221, the through-hole 85o of the elastic member 85, the second hollow portion 761b of the cylindrical portion 761, the hollow portion 762o of the fitting portion 762, and the in-case oil passage 222a of the transaxle case 222, thus lubricating and cooling the bearing 82.

Moreover, as shown in FIGS. 4 and 8, the converter housing 221 is provided therein with a hydraulic oil supply pipe 87 that is connected to the hydraulic pressure control device (not shown) through an oil hole 221b (refer to FIG. 4) formed in the converter housing 221 and with a hydraulic oil supply pipe 88 that is connected to the hydraulic oil supply pipe 87 through an oil hole 221c formed in the converter housing 221, an oil passage (not shown), and an oil hole 221d. The hydraulic oil supply pipe 87 is arranged so as to bypass the cylindrical portion 71 of the reservoir plate 70 in the converter housing 221. As shown in FIG. 8, the hydraulic oil supply pipe 88 is arranged so as to be located at least above the opening 710 formed in the cylindrical portion 71 of the reservoir plate 70, and is connected to an oil hole 221e formed in the converter housing 221.

At least one hydraulic oil supply hole 88o is formed in the hydraulic oil supply pipe 88 above the opening 71o of the cylindrical portion 71. This allows the hydraulic oil to be supplied from the hydraulic oil supply hole 88o of the hydraulic oil supply pipe 88 through the opening 71o of the cylindrical portion 71 to the pinion shaft 53 of the differential gear 50, thus lubricating and cooling the pinion shaft 53. The oil hole 221e described above is formed in the converter housing 221, and communicates with an oil passage 221f opening near the bearing 81. This allows the hydraulic oil to be supplied from the hydraulic oil supply pipe 88 through the oil hole 221e and the oil passage 221f to the bearing 81, thus lubricating and cooling the bearing 81. At least a part of the hydraulic oil supplied to the bearing 81 is discharged from the differential chamber 60 to the hydraulic oil storage chamber 65 through a clearance defined between the cylindrical portion 71 of the reservoir plate 70 and the converter housing 221.

When the vehicle equipped with the power transmission device 20 structured as described above runs (forward running), the differential ring gear 45 rotates in the direction indicated by the dashed-line arrow in each of FIGS. 3 and 9, and rakes up the hydraulic oil that has been used for lubricating, for example, the differential gear 50 and the bearings 81 and 82 and stays in the differential chamber 60, specifically, near the lower part of the differential ring gear 45. The hydraulic oil raked up by the differential ring gear 45 is discharged out of the differential chamber 60 through the openings 731o and 732o in the differential ring surrounding portion 73 of the reservoir plate 70.

In the present embodiment, the direction of helix of the differential ring gear 45 as a helical gear is determined so that the teeth of the differential ring gear 45 pick up the hydraulic oil in the differential chamber 60 toward the flange portion 72 of the reservoir plate 70 when the vehicle runs forward. This allows the hydraulic oil picked up by the differential ring gear 45 to be more effectively discharged out of the differential chamber 60 through the openings 731o and 732o extending to substantially the central part in the radial direction of the flange portion 72. As described above, the inner circumferential side projections 731b and 732b are provided on the inner circumferential surface of the differential ring surrounding portion 73 so as to extend along the edges on the upper sides of the openings 731o and 732o. The hydraulic oil picked up by the differential ring gear 45 hits the lower surfaces of the inner circumferential side projections 731b and 732b, and is guided toward the openings 731o and 732o. This allows the hydraulic oil to be still more effectively discharged out of the differential chamber 60 through the openings 731o and 732o.

The hydraulic oil discharged out of the differential chamber 60 through the openings 731o and 732o flows between the outer circumferential surface of the differential ring surrounding portion 73 and the inner circumferential surface 222n of the transaxle case 222. At this time, the hydraulic oil discharged from the openings 731o and 732o hits the outer circumferential side projections 731a and 732a and is guided toward the lower side of the reservoir plate 70 because the outer circumferential side projections 731a and 732a are provided on the outer circumferential surface of the differential ring surrounding portion 73 so as to extend along the edges on the upper sides of the openings 731o and 732o. The hydraulic oil flowing toward the lower side of the reservoir plate 70 is guided toward the cylindrical portion 71 by the outer circumferential side projection 731a projecting radially outward along the edge on the upper side of the opening 731o and the projection 73t projecting radially outward along the lower edge 73d of the differential ring surrounding portion 73, and flows into the hydraulic oil storage chamber 65 along the outer circumferential surface of the cylindrical portion 71 and the side surface 721 of the flange portion 72.

As described above, the outer circumferential side projection 731a is provided on the differential ring surrounding portion 73, so that re-entry of the hydraulic oil discharged from the opening 732o into the differential chamber 60 through the opening 731o can be suppressed. Moreover, the projection 73t is provided on the lower edge 73d of the differential ring surrounding portion 73, so that re-entry of the hydraulic oil into the differential chamber 60 through a clearance between the lower edge 73d and the inner circumferential surface 222n of the transaxle case 222 can be suppressed. The projection 73t extends to the outer circumferential edge 72a of the flange portion 72 (above the position in which the seal member 80 is provided) so as to slope downward as the projection 73t approaches the hydraulic oil storage chamber 65. This allows the projection 73t to effectively guide the hydraulic oil to the hydraulic oil storage chamber 65. The outer circumferential side projection 732a provided along the edge of the opening 732o also serves to suppress entry of the hydraulic oil coming from the upper side of the opening 732o along the outer circumferential surface of the differential ring surrounding portion 73 into the differential chamber 60.

In addition, in the present embodiment, the seal member 80 is interposed between the outer circumferential edge 72a of the flange portion 72 of the reservoir plate 70 and the inner circumferential surface 222n of the transaxle case 222 and between the outer circumferential edge 72a and the inner circumferential surface of the rib portion 222r. This allows the seal member 80 to suppress re-entry of the hydraulic oil discharged out of the differential chamber 60 through the openings 731o and 732o into the differential chamber 60 through the clearance between the outer circumferential edge 72a of the flange portion 72 and the inner circumferential surface 222n of the transaxle case 222 and between the outer circumferential edge 72a and the inner circumferential surface of the rib portion 222r. As a result, the power transmission device 20 of the present embodiment having the structure as described above can highly effectively suppress stay of the hydraulic oil in the differential chamber 60, simply using the rake-up operation performed by the differential ring gear 45. As a result, in the power transmission device 20, the stirring resistance of the hydraulic oil acting on the differential ring gear 45 can be further reduced.

As described above, the reservoir plate 70 serving as a dividing member for dividing the inside of the transmission case 22 of the power transmission device 20 into the differential chamber 60 and the hydraulic oil storage chamber 65 includes the cylindrical portion 71 and the flange portion 72, the cylindrical portion 71 covering a part of the differential gear 50, the flange portion 72 radially extending from the cylindrical portion 71. The cylindrical portion 71 is integrally formed with the flange portion 72, and the seal member 80 is interposed between the transmission case 22 (transaxle case 222) and the outer circumferential edge 72a of the flange portion 72. In other words, the outer circumferential edge 72a of the flange portion 72 includes the seal portion that extends along the inner circumferential surface 222n of the transmission case 22 (transaxle case 222) and suppresses entry of the hydraulic oil from the hydraulic oil storage chamber 65 into the differential chamber 60. This structure forms no clearance between the cylindrical portion 71 and the flange portion 72, so that the hydraulic oil does not flow into the differential chamber 60 through the boundary between the cylindrical portion 71 and the flange portion 72. The seal member 80 between the transmission case 22 and the flange portion 72 suppresses entry of the hydraulic oil from the hydraulic oil storage chamber 65 into the differential chamber 60. As a result, in the power transmission device 20, it is possible to more effectively suppress entry of the hydraulic oil into the differential chamber 60 in which the differential ring gear 45 and the differential gear 50 are arranged, and the stirring resistance of the hydraulic oil acting on the differential ring gear 45 can be further reduced.

The reservoir plate 70 includes the differential ring surrounding portion 73 that extends from the outer circumferential edge 72a of the flange portion 72 so as to cover a part of the differential ring gear 45 from above without interfering with the drive pinion gear 44. The differential ring surrounding portion 73 is integrally formed with the cylindrical portion 71 and the flange portion 72. The seal member 80 is provided at least in the range below the differential ring surrounding portion 73. This structure forms no clearance between the differential ring surrounding portion 73 and the flange portion 72, so that the hydraulic oil does not flow into the differential chamber 60 through the boundary between the differential ring surrounding portion 73 and the flange portion 72. The seal member 80 in the range below the differential ring surrounding portion 73 suppresses entry of the hydraulic oil from the hydraulic oil storage chamber 65 into the differential chamber 60. As a result, it is possible to still more effectively suppress entry of the hydraulic oil into the differential chamber 60.

Moreover, the differential ring surrounding portion 73 includes the openings 731o and 732o. This allows the hydraulic oil flowing into the differential chamber 60 and raked up by the differential ring gear 45 to be discharged out of the differential chamber 60 through the openings 731o and 732o of the differential ring surrounding portion 73. In such a structure, by providing the seal member 80 in the range of the outer circumferential edge 72a of the flange portion 72 below the differential ring surrounding portion 73, the seal member 80 can suppress re-entry of the hydraulic oil discharged from the openings 731o and 732o toward the hydraulic oil storage chamber 65 into the differential chamber 60 through the clearance between the outer circumferential edge 72a of the flange portion 72 and the transaxle case 222. As a result, simply using the rake-up operation performed by the differential ring gear 45 can highly effectively suppress stay of the hydraulic oil in the differential chamber 60. In the embodiment described above, the two openings 731o and 732o are formed in the differential ring surrounding portion 73. However, only one or more openings need to be formed in the differential ring surrounding portion 73.

The differential ring surrounding portion 73 includes the projection 73t projecting from the outer circumferential surface of the differential ring surrounding portion 73 along the lower edge 73d that extends in the axial direction of the differential ring gear 45 below the openings 731o and 732o. With this structure, the projection 73t can effectively suppress re-entry of the hydraulic oil, which has been raked up by the differential ring gear 45 and discharged out of the differential chamber 60 through the openings 731o and 732o of the differential ring surrounding portion 73, through near the lower edge 73d of the differential ring surrounding portion 73 into the differential chamber 60.

Moreover, the projection 73t is formed to reach the outer circumferential edge 72a of the flange portion 72 (to reach above the position in which the seal member 80 is provided) so as to slope downward as the projection 73t approaches the hydraulic oil storage chamber 65. This allows the projection 73t to effectively guide the hydraulic oil discharged out of the differential chamber 60 through the openings 731o and 732o, toward the hydraulic oil storage chamber 65.

Figure 13:
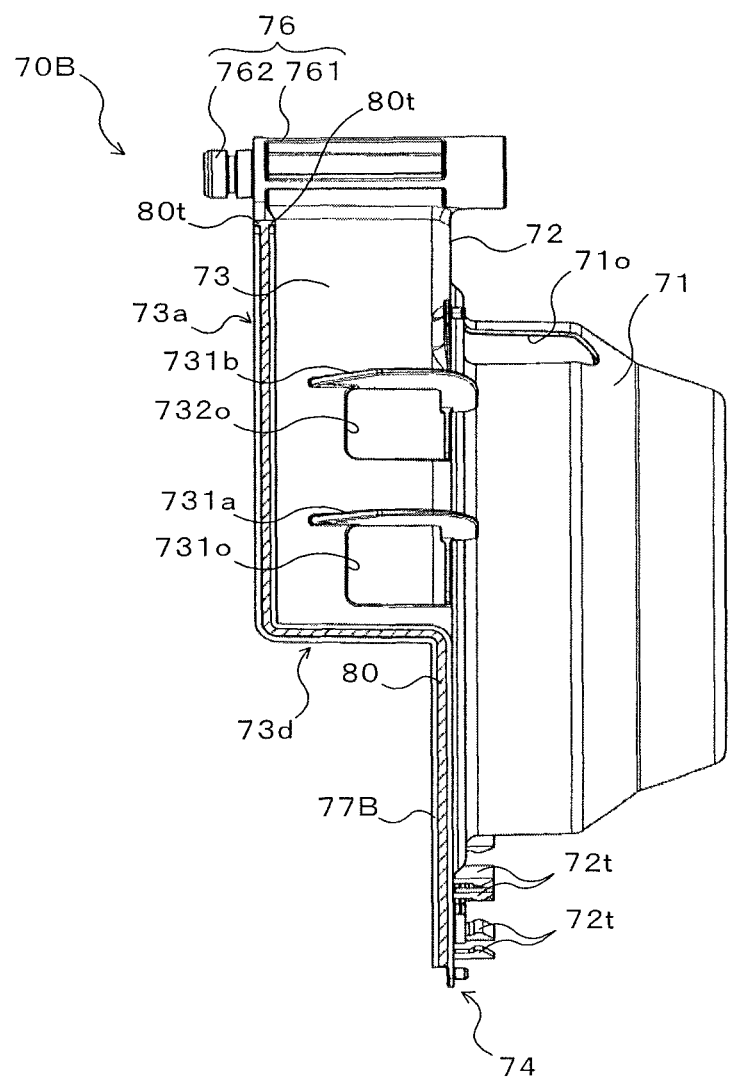
FIG. 13 is a side view showing a reservoir plate 70B according to another embodiment of the present disclosure.

FIG. 13 is a side view showing a reservoir plate 70B according to another embodiment of the present disclosure. As shown in FIG. 13, the reservoir plate 70B is obtained by excluding the projection 73t of the differential ring surrounding portion 73 from the reservoir plate 70 and including a seal support portion 77B instead of the seal support portion 77. The seal support portion 77B has a structure similar to that of the seal support portion 77, and is provided on the outer circumferential edge 72a of the flange portion 72 and also on the lower edge 73d of the differential ring surrounding portion 73 and the outer circumferential edge 73a thereof that extends in the circumferential direction from the lower edge 73d to the third fixing portion 76. Thai is, in the reservoir plate 70B, the seal member 80 is interposed between a portion including the outer circumferential edge 72a of the flange portion 72 and including the lower edge 73d and the outer circumferential edge 73a of the differential ring surrounding portion 73 and a portion including the inner circumferential surface 222n of the transaxle case 222 and the inner circumferential surface of the rib portion 222r.

With this structure, the seal member 80 between the lower edge 73d and the transaxle case 222 and between the outer circumferential edge 73a and the transaxle case 222 can effectively suppress re-entry of the hydraulic oil, which has been raked up by the differential ring gear 45 and discharged out of the differential chamber 60 through the openings 731o and 732o of the differential ring surrounding portion 73, through near the lower edge 73d and the outer circumferential edge 73a of the differential ring surrounding portion 73 into the differential chamber 60. The seal member 80 only needs to be interposed at least between a portion including the outer circumferential edge 72a of the flange portion 72 and the lower edge 73d of the differential ring surrounding portion 73 and the portion including the inner circumferential surface 222n of the transaxle case 222 and the inner circumferential surface of the rib portion 222r.

Figure 14:
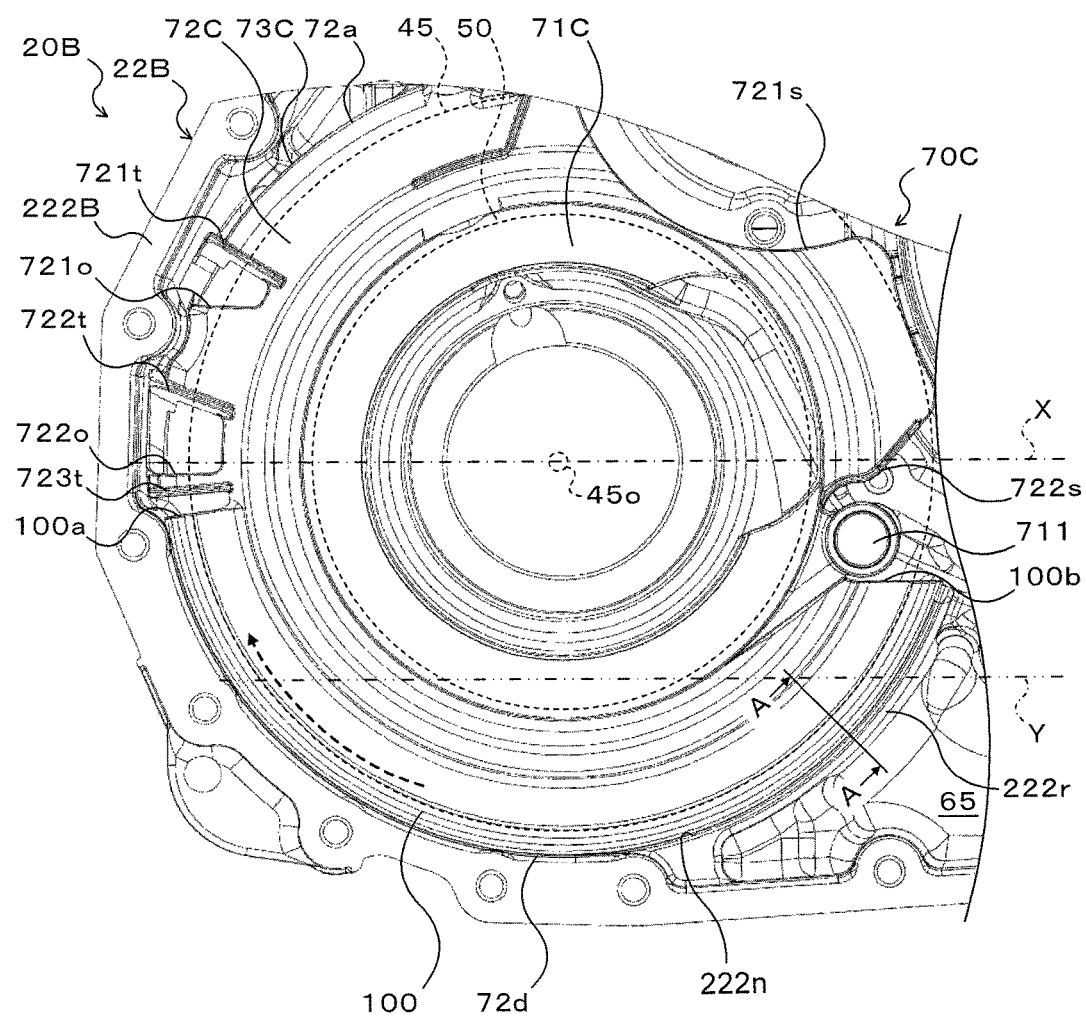
FIG. 14 is an explanatory diagram showing the inside of a transaxle case 222B in which a reservoir plate 70C according to still another embodiment is arranged.
Figure 15:
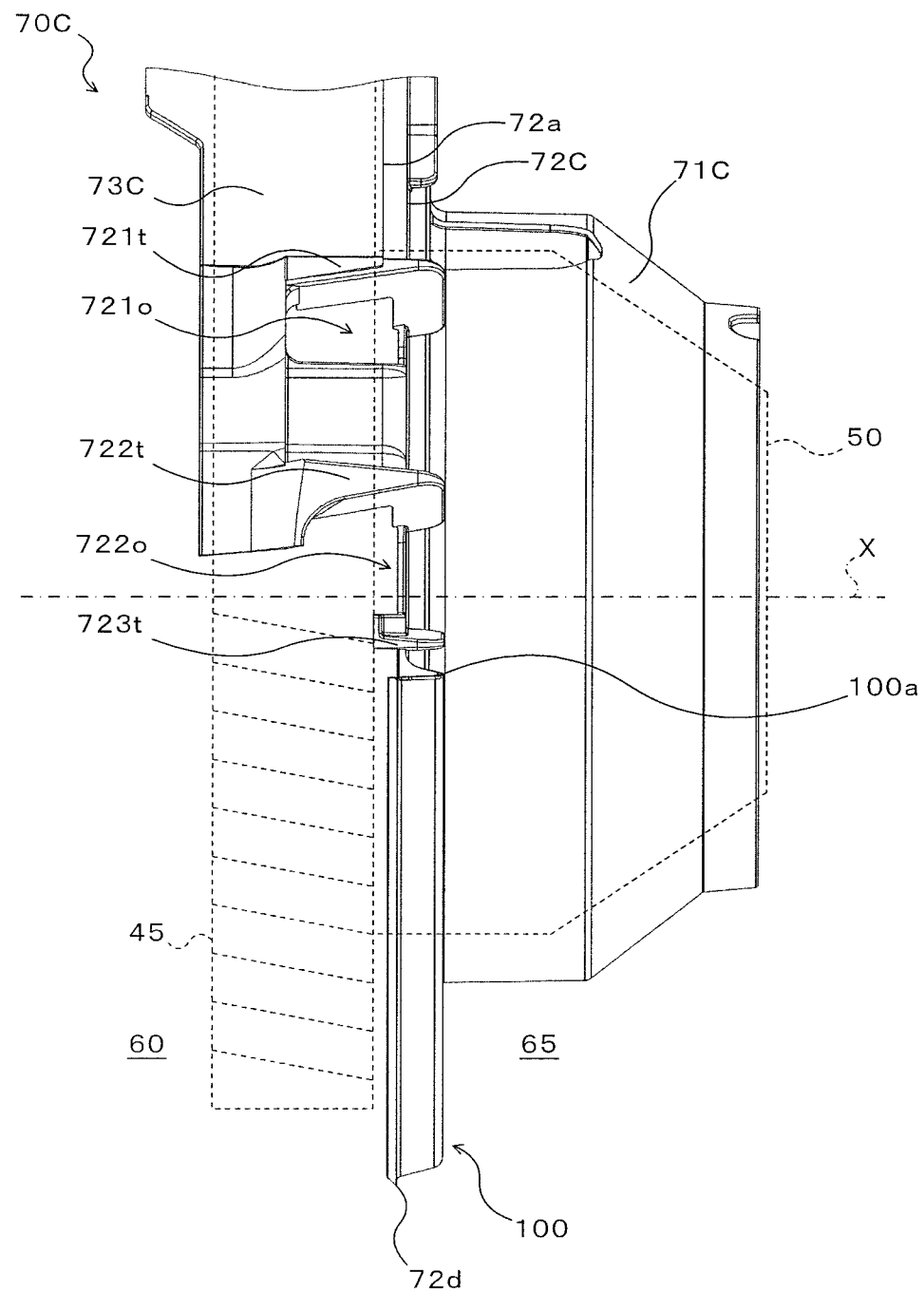
FIG. 15 is a side view showing the reservoir plate 70C.
Figure 16:
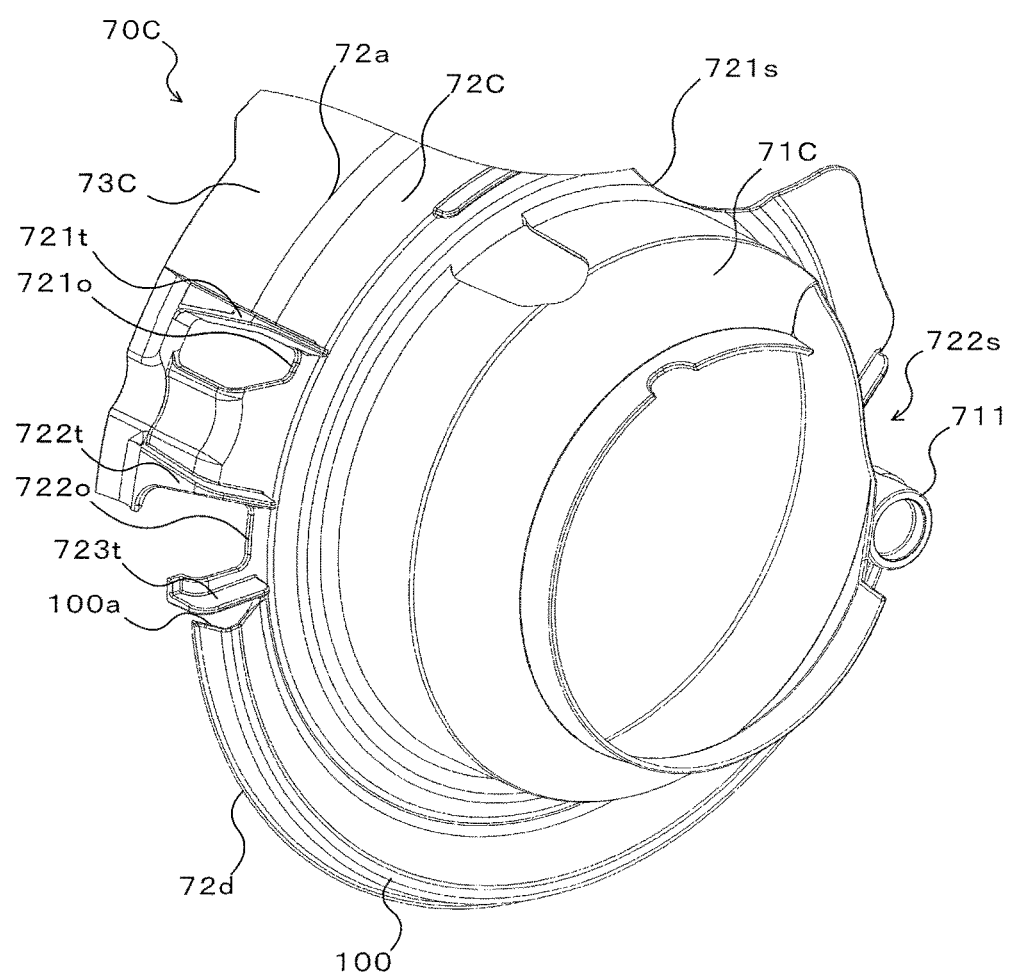
FIG. 16 is a perspective view showing the reservoir plate 70C.

Subsequently, the following describes a power transmission device 20B including a reservoir plate 70C according to still another embodiment, with reference to FIGS. 14 to 16. The power transmission device 20B includes, instead of the transmission case 22 of the power transmission device 20B described above, a transmission case 22B including a converter housing (not shown) and a transaxle case 222B. FIG. 14 is a front view showing the inside of the transaxle case 222B in which the reservoir plate 70C is arranged. FIGS. 15 and 16 are a side view and a perspective view showing the reservoir plate 70C. FIGS. 14 to 16 do not show a part in an upper part of the reservoir plate 70C.

As shown in FIGS. 14 to 16, the reservoir plate 70C includes a cylindrical portion 71C extending in the axial direction of the differential ring gear 45 so as to cover a part of the differential gear 50 from the outside, a flange portion 72C extending from the cylindrical portion 71C toward the outside in the radial direction of the differential ring gear 45, and a differential ring surrounding portion 73C extending from the outer circumferential edge 72a of the flange portion 72C. The reservoir plate 70C constituted by the cylindrical portion 71C, the flange portion 72C, and the differential ring surrounding portion 73C is also integrally formed of a resin. The reservoir plate 70C may, however, be formed of a material different from a resin.

As shown in FIGS. 14 and 15, the cylindrical portion 71C is formed substantially in a cylindrical shape so as to extend along a part of the outer circumferential surface of the differential gear 50 (differential case 54), and mainly surrounds a portion of the differential gear 50 except a portion thereof for mounting the differential ring gear 45 and an end thereof opposite to the differential ring gear 45. A fixing portion 711 for being fixed to the transmission case 22B is provided on a side portion of the cylindrical portion 71C. As shown in FIGS. 15 and 16, the flange portion 72C extends substantially in a circular arc shape from an end on the differential ring gear 45 side (left side in FIG. 15) of the cylindrical portion 71C toward the outside in the radial direction of the differential ring gear 45. The flange portion 72C includes a cutout 721s obtained by cutting out a part of the flange portion 72C so as to avoid interference with the drive pinion gear 44, and also includes a cutout 722s obtained by cutting out a part of the flange portion 72C so as to avoid interference with the transaxle case 222B abutting on the fixing portion 711 of the cylindrical portion 71C, as shown in FIG. 14.

In the present embodiment, as shown in FIG. 14, the transaxle case 222B includes the inner circumferential surface 222n that is provided below a horizontal plane X including an axial center 45o of the differential ring gear 45 (refer to the dashed-dotted line shown in each of FIGS. 14 and 15) so as to extend in a circular arc shape along the outer circumference of the differential ring gear 45 and to surround substantially the lower half of the differential ring gear 45. The inner circumferential surface 222n is provided across a portion extending from a side wall to the bottom of the transaxle case 222B and the rib portion 222r provided in the transaxle case 222B. As shown in FIG. 14, the flange portion 72C includes a lower edge 72d as a part of the outer circumferential edge 72a provided so as to extend along the inner circumferential surface 222n of the transaxle case 222B in the state in which the reservoir plate 70C is arranged in the transaxle case 222B. Both ends of each of the lower edge 72d of the flange portion 72C and the inner circumferential surface 222n of the transaxle case 222B are provided so as to be located above an oil surface Y of the hydraulic oil in the hydraulic oil storage chamber 65 when the vehicle equipped with the power transmission device 20B is stopping or running on a flat road (for example, refer to the chain double-dashed line shown in FIG. 14; hereinafter, simply called "oil surface Y of the hydraulic oil in the hydraulic oil storage chamber 65").

The differential ring surrounding portion 73C extends from an upper part of the flange portion 72C toward the side opposite to the cylindrical portion 71C in the axial direction of the differential ring gear 45. As shown in FIGS. 15 and 16, the differential ring surrounding portion 73C is formed substantially in a circular arc shape along the outer circumferential surface of the differential ring gear 45, and covers substantially a quarter of the outer circumferential surface of the differential ring gear 45 from above in the state in which the reservoir plate 70C is arranged in the transmission case 22B. With this structure, the differential ring surrounding portion 73C can effectively suppress flow of the hydraulic oil, which has been flying from above the reservoir plate 70C (above the differential ring gear 45) in the transmission case 22B, down to the vicinity of the differential ring gear 45 in the differential chamber 60. A fixing portion (not shown) for being fixed to the transmission case 22B is provided on an upper part of the differential ring surrounding portion 73C.

As shown in FIGS. 14 to 16, the flange portion 72C and the differential ring surrounding portion 73C include first and second openings 721O and 722o formed along the circumferential direction of the differential ring gear 45. The first opening 721O is formed across the flange portion 72C and the differential ring surrounding portion 73C so as to extend from substantially the central part of the flange portion 72C in the radial direction of the differential ring gear 45 to substantially the central part of the differential ring surrounding portion 73C in the axial direction of the differential ring gear 45. The second opening 722o is formed so as to extend from substantially the central part of the flange portion 72C in the radial direction of the differential ring gear 45 to the outer circumferential edge of the flange portion 72C. A part of the lower edge 73d of the differential ring surrounding portion 73C is cut out, so that the upper edge of the second opening 722o extends to substantially the central part in the axial direction of the differential ring surrounding portion 73C.

Moreover, the flange portion 72C and the differential ring surrounding portion 73C include first and second projecting guides 721t and 722t that are formed so as to extend along the upper edges of the first and the second openings 721O and 722o, respectively, and to project from a surface on the hydraulic oil storage chamber 65 side (right side in FIG. 15) of the flange portion 72C and from the outer circumferential surface of the differential ring surrounding portion 73C. The flange portion 72C includes a third projecting guide 723t that is formed so as to extend along the lower edge of the second opening 722o in a manner covering the lower side of the second opening 722o, and to project from the surface on the hydraulic oil storage chamber 65 side (right side in FIG. 15) of the flange portion 72C.

The reservoir plate 70C structured as described above is arranged in the transaxle case 222B so that the lower edge 72d of the flange portion 72C abuts on the inner circumferential surface 222n of the transaxle case 222B, as shown in 14. Then, the converter housing (not shown) is fastened with a plurality of bolts to the transaxle case 222B near from a viewer in FIG. 14, so that the reservoir plate 70C is supported between the converter housing and the transaxle case 222B at the fixing portion 711 provided on the cylindrical portion 71C and at the fixing portion (not shown) provided on the differential ring surrounding portion 73C. Accordingly, the reservoir plate 70C is fixed to the transmission case 22B, and the reservoir plate 70C divides the inside of the transmission case 22B into the differential chamber 60 and the hydraulic oil storage chamber 65.

Figure 17:
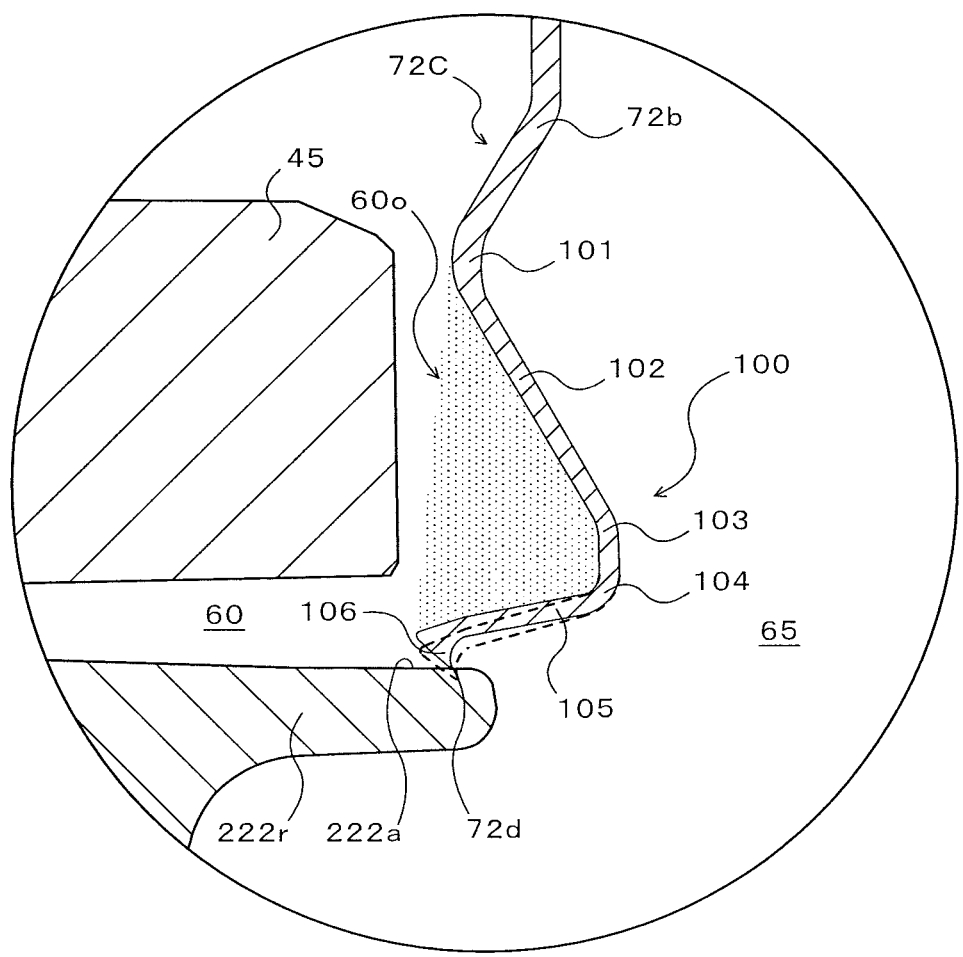
FIG. 17 is an enlarged sectional view taken along line A-A shown in FIG. 14.

Subsequently, the following describes the structure of the seal portion provided on the lower edge 72d of the reservoir plate 70C. FIG. 17 is an enlarged sectional view taken along line A-A shown in FIG. 14. As shown in FIGS. 14 to 17, the flange portion 72C of the reservoir plate 70C includes an elastic projection (oil chamber defining portion) 100 that is formed so as to extend in a circular arc shape along the lower edge 72d and to project toward the hydraulic oil storage chamber 65 side of the lower edge 72d.

As shown in FIGS. 14 to 16, the elastic projection 100 is provided below the horizontal plane X including the axial center 45o of the differential ring gear 45 so as to extend along the lower edge 72d from the cutout 722s of the flange portion 72C to below the third projecting guide 723t. A part of the flange portion 72C below the third projecting guide 723t is cut out, so that a slight clearance is provided between the third projecting guide 723t and the elastic projection 100. As a result, the elastic projection 100 includes an open end 100a opening below the third projecting guide 723t and an open end 100b opening in the cutout 722s. The open ends 100a and 100b are located above the oil surface Y of the hydraulic oil in the hydraulic oil storage chamber 65.

As shown in FIG. 17, the elastic projection 100 includes a first slope portion 102 that extends from a base portion 72b of the flange portion 72C extending from the outer circumferential surface of the cylindrical portion 71C so as to slope toward the hydraulic oil storage chamber 65 side (right side in FIG. 17) as the first slope portion 102 approaches the outer circumference of the flange portion 72C; a second slope portion 105 that extends from an end of the first slope portion 102 through second and third curved portions 103 and 104 so as to slope toward the differential chamber 60 side (left side in FIG. 17) as the second slope portion 105 approaches the outer circumference of the flange portion 72C; and a distal end portion 106 that is provided at an end of the second slope portion 105 and extends toward the lower edge 72d abutting on the inner circumferential surface 222n of the transaxle case 222B.

As shown in FIG. 17, first and second curved portions 101 and 103 are formed so as to be curved at angles larger than that of the third curved portion 104. The first slope portion 102 is formed to be longer than the second slope portion 105 in the radial and the axial directions of the differential ring gear 45. The distal end portion 106 extends from the end of the second slope portion 105 to the lower edge 72d so as to taper toward the hydraulic oil storage chamber 65 side (right side in FIG. 17). In other words, a surface on the differential chamber 60 side (left side in FIG. 17) of the distal end portion 106 extends from the end of the second slope portion 105 so as to slope toward the hydraulic oil storage chamber 65 side (right side in FIG. 17) as the surface approaches the lower edge 72d.

The elastic projection 100 as described above is formed so as to be elastically deformed at the first, the second, and the third curved portions 101, 103, and 104 mainly in the radial direction of the differential ring gear 45 (for example, so as to be elastically deformed mainly at the third curved portion 104 from the state indicated by the dashed line to the state indicated by the solid line in FIG. 17) when the reservoir plate 70C is fixed to the transmission case 22B. In other words, the lower edge 72d of the flange portion 72C is elastically pressed onto the inner circumferential surface 222n of the transaxle case 222B in the state in which the reservoir plate 70C is fixed to the transmission case 22B. As a result, the seal portion for suppressing entry of the hydraulic oil from the hydraulic oil storage chamber 65 into the differential chamber 60 can be provided on the lower edge 72d without separately attaching a seal member to the lower edge 72d of the flange portion 72C. In other words, the lower edge 72d of the flange portion 72C pressed onto the inner circumferential surface 222n of the transaxle case 222B serves, by itself, as the seal portion.

As shown in FIG. 17, the elastic projection 100 is formed to be thinner than the base portion 72b of the flange portion 72C extending from the outer circumferential surface of the differential cover portion 71C to the elastic projection 100. This allows the elastic projection 100 to be more effectively deformed at the first, the second, and the third curved portions 101, 103, and 104. It should be noted that providing the plurality of curved portions (first, second, and third curved portions 101, 103, and 104) can ensure a sufficient length of the elastic projection 100 in the radial and the axial directions of the differential ring gear 45, and thus can ensure the strength of the elastic projection 100 even if the elastic projection 100 is formed to be thinner than the base portion 72b of the flange portion 72C. Moreover, the first and the second curved portions 101 and 103 are formed so as to be curved at angles larger than that of the third curved portion 104, and the first slope portion 102 is formed to be relatively longer in the radial and the axial directions of the differential ring gear 45. Thus, a reaction force applied to the reservoir plate 70C can be further reduced by elastically pressing the lower edge 72d onto the inner circumferential surface 222n of the transaxle case 222B. The elastic projection 100, however, only needs to have one or more curved portions so as to allow the lower edge 72d of the flange portion 72C to be elastically pressed onto the inner circumferential surface 222n of the transaxle case 222B.

In addition, as described above, the surface on the differential chamber 60 side of the distal end portion 106 extends from the end of the second slope portion 105 so as to slope toward the hydraulic oil storage chamber 65 side as the surface approaches the lower edge 72d. Thus, the reservoir plate 70C can be inserted into the transaxle case 222B from the right side in FIG. 17 so that the distal end portion 106 is brought up onto the inner circumferential surface 222n of the transaxle case 222B. As a result, as the reservoir plate 70C is arranged into the transaxle case 222B, the elastic projection 100 can be easily elastically deformed from the state indicated by the dashed line to the state indicated by the solid line in FIG. 17, and the lower edge 72d of the flange portion 72C can be elastically pressed onto the inner circumferential surface 222n of the transaxle case 222B. The shape of the distal end portion 106 is, however, not limited to that shown in the present embodiment.

The following describes the structure for discharging the hydraulic oil in the differential chamber 60 to the hydraulic oil storage chamber 65 through the reservoir plate 70C, and also describes the flow of the hydraulic oil. In the present embodiment, as shown in FIG. 15, the differential ring gear 45 is structured as a helical gear, and is arranged so as to obliquely rake up the hydraulic oil in the differential chamber 60 toward the hydraulic oil storage chamber 65 side (right side in FIG. 15) when the differential ring gear 45 rotates in the main rotational direction, that is, in the direction of rotation when the vehicle equipped with the power transmission device 20B runs forward (refer to the dashed-line arrow in FIG. 14). As described above, the first and the second openings 721o and 722o are formed in the flange portion 72C and the differential ring surrounding portion 73C of the reservoir plate 70C. With this structure, while the vehicle equipped with the power transmission device 20B is running forward, the hydraulic oil in the differential chamber 60 which is raked up by the rotation of the differential ring gear 45 can be effectively discharged through near the first and the second openings 721o and 722o and through near the lower edge 73d of the differential ring surrounding portion 73C, out of the differential chamber 60, that is, into the hydraulic oil storage chamber 65.

The first and the second projecting guides 721t and 722t extending along the upper edges of the first and the second openings 721o and 722o are provided on the flange portion 72C and the differential ring surrounding portion 73C. With this structure, the hydraulic oil that has been discharged from the first and the second openings 721o and 722o and has hit the first and the second projecting guides 721t and 722t is effectively guided downward and toward the hydraulic oil storage chamber 65 side. Thus, it is possible to effectively suppress re-entry of the hydraulic oil into the differential chamber 60 through the first and the second openings 721o and 722o. Moreover, the first and the second projecting guides 721t and 722t serve to suppress entry of the hydraulic oil flowing down from above the first and the second openings 721o and 722o, respectively, into the differential chamber 60 through the first and the second openings 721o and 722o.

The elastic projection 100 formed in the flange portion 72C of the reservoir plate 70C serves as an oil passage defining portion for defining an oil passage 60o extending in the differential chamber 60. Specifically, as shown in FIG. 17, a region surrounded by the elastic projection 100 in the differential chamber 60 forms the oil passage 60o that extends in the circumferential direction of the differential ring gear 45 along the lower edge 72d in the differential chamber 60 and projects toward the hydraulic oil storage chamber 65 side. As described above, the elastic projection 100 includes the open end 100a opening below the third projecting guide 723t. This causes the oil passage 60o extending in the differential chamber 60 to communicate with a space on the hydraulic oil storage chamber 65 side (right side in FIG. 15) through the open end 100a.

As a result, while the vehicle equipped with the power transmission device 20B is running forward, the hydraulic oil staying in the lower part of the differential chamber 60 is pushed by teeth of the differential ring gear 45 to gather in the oil passage 60o projecting toward the hydraulic oil storage chamber 65 side, and forms a flow toward the advancing direction in the main rotational direction of the differential ring gear 45 in the oil passage 60o. The hydraulic oil in the oil passage 60o then flows out of the differential chamber 60 from the open end 100a opening toward the advancing direction in the main rotational direction of the differential ring gear 45 based on the oil surface Y of the hydraulic oil in the hydraulic oil storage chamber 65, and flows into the hydraulic oil storage chamber 65. Accordingly, as for the hydraulic oil that has not been directly discharged by the differential ring gear 45 out of the differential chamber 60 through the first and the second openings 721o and 722o and stays in the differential chamber 60, the power transmission device 20B, using the rotation of the differential ring gear 45, can discharge the hydraulic oil out of the differential chamber 60, that is, into the hydraulic oil storage chamber 65 through the oil passage 60o defined by the elastic projection 100 of the reservoir plate 70C. This can further improve the dischargeability of the hydraulic oil in the differential chamber 60 defined by the reservoir plate 70C.

As described above, the elastic projection 100 is provided below the horizontal plane X including the axial center 45o of the differential ring gear 45. This allows the hydraulic oil staying in the lower part of the differential chamber 60 to be effectively discharged out of the differential chamber 60 through the oil passage 60o defined by the elastic projection 100. In addition, in the present embodiment, the third projecting guide 723t is provided above the open end 100a of the elastic projection 100, the third projecting guide 723t projecting from the flange portion 72C in a manner covering the lower side of the second opening 722o formed in the flange portion 72C. This can effectively suppress re-entry of the hydraulic oil discharged from the second opening 722o into the differential chamber 60 through the open end 100a.

In this way, the power transmission device 20B of the present embodiment can effectively discharge the hydraulic oil flowing into the differential chamber 60 to the hydraulic oil storage chamber 65 through the reservoir plate 70C, and effectively suppress, for example, entry of the discharged hydraulic oil and the hydraulic oil stored in the hydraulic oil storage chamber 65 into the differential chamber 60. As a result, it is possible to effectively suppress stay of the hydraulic oil in the differential chamber 60, and the rotational resistance (stirring resistance) of the differential ring gear 45 can be further reduced.

The flange portion 72C need not have the curved portions, provided that the lower edge 72d can be elastically pressed onto the inner circumferential surface 222n of the transaxle case 222B. For example, the flange portion 72C may extend from the cylindrical portion 71C parallel to the differential ring gear 45 in the radial direction thereof, and may be partially curved so as to elastically press the lower edge 72d onto the inner circumferential surface 222n of the transaxle case 222B. The elastic projection 100 may extend to above the horizontal plane X including the axial center 45o of the differential ring gear 45.

In the embodiments described above, the power transmission device 20 corresponds to, for example, a "power transmission device", the power transmission device 20 including the differential ring gear 45 that is arranged below the drive pinion gear 44 on the input side and meshes with the drive pinion gear 44, the differential gear 50 connected to the differential ring gear 45, the transmission case 22 accommodating the differential ring gear 45 and the differential gear 50, the reservoir plate 70 serving as a dividing member that divides the inside of the transmission case 22 into the differential chamber 60 in which the differential ring gear 45 and the differential gear 50 are arranged and the hydraulic oil storage chamber 65 storing the hydraulic oil; the cylindrical portion 71 covering a part of the differential gear corresponds to, for example, a "cylindrical portion"; the flange portion 72 radially extending from the cylindrical portion 71 corresponds to, for example, a "flange portion"; the differential ring surrounding portion 73 extending from the outer circumferential edge 72a of the flange portion 72 so as to cover a part of the differential ring gear 45 from above without interfering with the drive pinion gear 44 corresponds to, for example, a "differential ring surrounding portion"; the seal member 80 provided on the outer circumferential edge 72a of the flange portion 72 corresponds to, for example, a "seal portion"; each of the openings 731o and 732o formed in the differential ring surrounding portion 73 corresponds to, for example, an "opening"; and the projection 73t projecting from the outer circumferential surface of the differential ring surrounding portion 73 along the lower edge 73d extending in the axial direction of the differential ring gear 45 below the opening 731o corresponds to, for example, a "projection".

While the embodiments of the present disclosure have been described, the present disclosure is not in any way limited to the embodiments described above, and various modifications may be obviously adopted within the breadth of the present disclosure. The above-described embodiments to carry out the disclosure are merely specific examples of the disclosure described in the summary, and do not limit the elements of the disclosure described in the summary.

INDUSTRIAL APPLICABILITY

The present disclosure can be used in, for example, industries manufacturing power transmission devices.

The invention claimed is:
1. A power transmission device comprising:
a differential ring gear that meshes with a drive pinion gear;
a differential gear connected to the differential ring gear;

a case accommodating the differential ring gear and the differential gear; and a dividing member that divides an inside of the case into a differential chamber in which the differential ring gear and the differential gear are arranged and a hydraulic oil storage chamber that stores hydraulic oil, wherein a seal portion extending continuously along an inner circumferential surface of the case is provided on an outer circumferential edge of the dividing member in a range including a lowest point of the outer circumferential edge of the dividing member.

2. The power transmission device according to claim 1, wherein the dividing member includes a flange portion, the flange portion radially extending from the cylindrical portion, and the seal portion is a seal member provided between the case and the outer circumferential edge of the flange portion.

3. The power transmission device according to claim 2, wherein the dividing member includes a differential ring surrounding portion that extends from the outer circumferential edge of the flange portion so that a part of the differential ring gear is covered from above without interfering with the drive pinion gear, the differential ring surrounding portion is integrally formed with the cylindrical portion and the flange portion, and the seal portion is provided below the differential ring surrounding portion.

4. The power transmission device according to claim 3, wherein the differential ring surrounding portion includes at least one opening.

5. The power transmission device according to claim 4, wherein the differential ring surrounding portion includes a projection that projects from an outer circumferential surface of the differential ring surrounding portion along an edge of the differential ring surrounding portion extending in the axial direction of the differential ring gear below the opening.

6. The power transmission device according to claim 5, wherein the projection extends to the outer circumferential edge of the flange portion so as to slope downward as the projection approaches the hydraulic oil storage chamber.

7. The power transmission device according to claim 4, wherein the edge of the differential ring surrounding portion extending in the axial direction of the differential ring gear below the opening is provided with a seal portion that extends along the inner circumferential surface of the case and suppresses entry of the hydraulic oil into the differential chamber.

8. The power transmission device according to claim 1, wherein the dividing member includes a flange portion, the flange portion radially extending from the cylindrical portion, and the dividing member includes a differential ring surrounding portion that extends from the outer circumferential edge of the flange portion so that a part of the differential ring gear is covered from above without interfering with the drive pinion gear, the differential ring surrounding portion is integrally formed with the cylindrical portion and the flange portion, and the seal portion is provided below the differential ring surrounding portion.

9. The power transmission device according to claim 8, wherein the differential ring surrounding portion includes at least one opening.

10. The power transmission device according to claim 9, wherein the differential ring surrounding portion includes a projection that projects from an outer circumferential surface of the differential ring surrounding portion along an edge of the differential ring surrounding portion extending in the axial direction of the differential ring gear below the opening.

11. The power transmission device according to claim 10, wherein the projection extends to the outer circumferential edge of the flange portion so as to slope downward as the projection approaches the hydraulic oil storage chamber.

12. The power transmission device according to claim 9, wherein the edge of the differential ring surrounding portion extending in the axial direction of the differential ring gear below the opening is provided with a seal portion that extends along the inner circumferential surface of the case and suppresses entry of the hydraulic oil into the differential chamber.

13. The power transmission device according to claim 2, wherein the seal member is supported by the outer circumferential edge of the flange portion.

14. The power transmission device according to claim 13, wherein the seal member is positioned relative to the flange portion of the dividing member by mating engagement.

15. The power transmission device according to claim 14, wherein engaging recesses are formed at both ends of the seal support portion of the flange portion, engaging projections are formed at both ends of the seal member, and the seal member is positioned relative to the flange portion of the dividing member by engaging the engaging recesses of the flange portion with the engaging projections of the seal member.

16. The power transmission device according to claim 13, wherein a seal support portion is formed at the outer circumferential edge of the flange portion, and the seal member is supported by the seal support of the flange portion.

17. The power transmission device according to claim 16, wherein the seal support portion of the flange portion includes a groove in which the seal member fits.

18. The power transmission device according to claim 1, wherein the case includes a first case and a second case, the differential ring gear is disposed within the second case, the dividing member is disposed between the differential gear and the first case such that the dividing member is located on a lateral side of the differential ring gear, the dividing member divides the inside of the case such that the hydraulic oil storage chamber is defined on a side of the first case and the differential chamber is defined on a side of the second case, and the seal portion is provided between the outer circumferential edge of the dividing member and an inner circumferential surface of the second case.

19. The power transmission device according to claim 1, wherein an end of the seal portion on an upstream side in a direction of rotation of the differential ring gear during forward running of a vehicle equipped with the power transmission device is located below another end of the seal portion on a downstream side in the direction of the rotation of the differential ring gear.

20. The power transmission device according to claim 1, wherein the case includes a first inner circumferential surface, extending in a circular arc shape along an outer circumference of the differential ring gear, on a downstream side in a direction of rotation of the differential ring gear during forward running of a vehicle equipped with the power transmission device when viewed from a lowest point of the differential ring gear, and a second inner circumferential surface, extending in a circular arc shape along a part of the differential ring gear, on a upstream side in the direction of the rotation of the differential ring gear when viewed from the lowest point of the differential ring gear, the outer circumferential edge of the dividing member is formed so as to extend in a circular arc shape, and the seal portion is provided between the outer circumferential edge of the dividing member and the first and the second inner circumferential surface of the case.

21. The power transmission device according to claim 20, wherein the second inner surface of the case has the same curvature radius as the first inner surface of the case.

22. The power transmission device according to claim 1, wherein the differential ring gear is structured as a helical gear, and a direction of helix of the differential ring gear is determined so that teeth of the differential ring gear pick up the hydraulic oil in the differential chamber toward the dividing member when a vehicle runs forward.

23. The power transmission device according to claim 1, wherein the dividing member is formed of a resin.

24. The power transmission device according to claim 1 further comprising, a hydraulic pressure control device, and an oil pump configured to suction the hydraulic oil and feed the hydraulic oil with pressure to the hydraulic pressure control device.

25. The power transmission device according to claim 1, wherein the seal portion suppresses entry of the hydraulic oil from the hydraulic oil storage chamber into the differential chamber.

26. The power transmission device according to claim 1, wherein the seal portion is configured to contact with the inner circumferential surface of the case such that the contact portion of the seal portion is located away from the differential ring gear in an axial direction of the differential ring gear when viewed in a radial direction of the differential ring gear.

27. A dividing member for a power transmission device disposed inside a case which accommodates a differential ring gear and a differential gear connected to the differential ring gear; wherein the dividing member is disposed on one lateral side of the differential ring gear, and the dividing member comprises a seal member attached to an outer circumferential edge of the dividing member, extending along an inner circumferential surface of the case, suppresses entry of the hydraulic oil from the hydraulic oil storage chamber into the differential chamber, and the seal member is configured to extend along the inner circumferential surface of the case in a range including a lowest point of the outer circumferential edge of the dividing member.

* * * * *